(12) United States Patent
Lindhé et al.

(10) Patent No.: US 11,921,517 B2
(45) Date of Patent: Mar. 5, 2024

(54) CONTROLLING MOVEMENT OF A ROBOTIC CLEANING DEVICE

(71) Applicant: Aktiebolaget Electrolux, Stockholm (SE)

(72) Inventors: Magnus Lindhé, Stockholm (SE); Petter Forsberg, Stockholm (SE); Niklas Nordin, Stockholm (SE)

(73) Assignee: Aktiebolaget Electrolux, Stockholm (SE)

( * ) Notice: Subject to any disclaimer, the term of this patent is extended or adjusted under 35 U.S.C. 154(b) by 286 days.

(21) Appl. No.: 16/650,167

(22) PCT Filed: Sep. 26, 2017

(86) PCT No.: PCT/EP2017/074406
§ 371 (c)(1),
(2) Date: Mar. 24, 2020

(87) PCT Pub. No.: WO2019/063066
PCT Pub. Date: Apr. 4, 2019

(65) Prior Publication Data
US 2021/0200236 A1   Jul. 1, 2021

(51) Int. Cl.
*G05D 1/00* (2006.01)
*A47L 9/28* (2006.01)

(52) U.S. Cl.
CPC .......... *G05D 1/0274* (2013.01); *A47L 9/2852* (2013.01); *G05D 1/0011* (2013.01);
(Continued)

(58) Field of Classification Search
CPC .. G05D 1/0274; G05D 1/0011; G05D 1/0219; G05D 2201/0215; G05D 1/0016;
(Continued)

(56) References Cited

U.S. PATENT DOCUMENTS 1,286,321 A   12/1918   Hoover
1,401,007 A   12/1921   Staples
(Continued)

FOREIGN PATENT DOCUMENTS

CA   2154758   6/1995
CN   1116818   2/1996
(Continued)

OTHER PUBLICATIONS

Korean Notification of Reason for Refusal for Korean Application No. 10-2020-7007947, dated Jan. 26, 2022, with translation, 12 pages.
(Continued)

*Primary Examiner* — Bao Long T Nguyen
(74) *Attorney, Agent, or Firm* — Bradley Arant Boult Cummings LLP

(57) ABSTRACT

A method of controlling movement of a robotic cleaning device over an area to be cleaned. The method includes storing at least one representation of the area over which the robotic cleaning device is to move, receiving an instruction to execute a cleaning program, localizing, in response to the instruction, the robotic cleaning device relative to the stored representation, and moving over the area to be cleaned as stipulated by the cleaning program by taking into account the stored representation.

26 Claims, 5 Drawing Sheets

(52) U.S. Cl.
CPC ........ *G05D 1/0219* (2013.01); *A47L 2201/04* (2013.01); *G05D 2201/0215* (2013.01)

(58) Field of Classification Search
CPC .. G05D 1/0044; G05D 1/0214; G05D 1/0212; G05D 1/0297; G05D 2201/0203; G05D 2201/0208; A47L 9/2852; A47L 2201/04; A47L 5/00; A47L 11/4011
See application file for complete search history.

(56) References Cited

U.S. PATENT DOCUMENTS

| | | |
|---|---|---|
| 1,823,128 A | 9/1931 | Scott |
| 3,010,129 A | 11/1961 | Moore |
| 3,233,274 A | 2/1966 | Kroll |
| 3,550,714 A | 12/1970 | Bellinger |
| 3,570,227 A | 3/1971 | Bellinger |
| 3,713,505 A | 1/1973 | Muller |
| 3,837,028 A | 9/1974 | Bridge |
| 4,028,765 A | 6/1977 | Liebscher |
| 4,036,147 A | 7/1977 | Westling |
| 4,114,711 A | 9/1978 | Wilkins |
| 4,119,900 A | 10/1978 | Kremnitz |
| 4,306,174 A | 12/1981 | Mourier |
| 4,306,329 A | 12/1981 | Yokoi |
| 4,369,543 A | 1/1983 | Chen |
| 4,502,173 A | 3/1985 | Patzold |
| 4,627,511 A | 12/1986 | Yajima |
| 4,647,209 A | 3/1987 | Neukomm |
| 4,777,416 A | 10/1988 | George, II |
| 4,800,978 A | 1/1989 | Wasa |
| 4,822,450 A | 4/1989 | Davis |
| 4,825,091 A | 4/1989 | Breyer |
| 4,836,905 A | 6/1989 | Davis |
| 4,838,990 A | 6/1989 | Jucha |
| 4,842,686 A | 6/1989 | Davis |
| 4,849,067 A | 7/1989 | Jucha |
| 4,854,000 A | 8/1989 | Takimoto |
| 4,864,511 A | 9/1989 | Moy |
| 4,872,938 A | 10/1989 | Davis |
| 4,878,003 A | 10/1989 | Knepper |
| 4,886,570 A | 12/1989 | Davis |
| 4,918,607 A | 4/1990 | Wible |
| 4,919,224 A | 4/1990 | Shyu |
| 4,922,559 A | 5/1990 | Wall |
| 4,959,192 A | 9/1990 | Trundle |
| 4,962,453 A | 10/1990 | Pong |
| 4,989,818 A | 2/1991 | Trundle |
| 5,001,635 A | 3/1991 | Yasutomi |
| 5,006,302 A | 4/1991 | Trundle |
| 5,023,444 A | 6/1991 | Ohman |
| 5,032,775 A | 7/1991 | Mizuno |
| 5,034,673 A | 7/1991 | Shoji |
| 5,042,861 A | 8/1991 | Trundle |
| 5,045,118 A | 9/1991 | Mason |
| 5,086,535 A | 2/1992 | Grossmeyer |
| 5,095,577 A | 3/1992 | Jonas |
| 5,107,946 A | 4/1992 | Kamimura |
| 5,155,683 A | 10/1992 | Rahim |
| 5,243,732 A | 9/1993 | Koharagi |
| 5,245,177 A | 9/1993 | Schiller |
| 5,276,933 A | 1/1994 | Hennessey |
| 5,279,672 A | 1/1994 | Betker |
| 5,293,955 A | 3/1994 | Lee |
| 5,307,273 A | 4/1994 | Oh |
| 5,309,592 A | 5/1994 | Hiratsuka |
| 5,341,540 A | 8/1994 | Soupert |
| 5,345,639 A | 9/1994 | Tanoue |
| 5,349,378 A | 9/1994 | Maali |
| 5,353,224 A | 10/1994 | Lee |
| 5,367,458 A | 11/1994 | Roberts |
| 5,369,347 A | 11/1994 | Yoo |
| 5,377,106 A | 12/1994 | Drunk |
| 5,390,627 A | 2/1995 | van der Berg |
| 5,398,632 A | 3/1995 | Goldbach |
| 5,402,051 A | 3/1995 | Fujiwara |
| 5,440,216 A | 8/1995 | Kim |
| 5,444,893 A | 8/1995 | Hwang |
| 5,444,965 A | 8/1995 | Colens |
| 5,446,356 A | 8/1995 | Kim |
| 5,454,129 A | 10/1995 | Kell |
| 5,464,494 A | 11/1995 | Bolt |
| 5,518,552 A | 5/1996 | Tanoue |
| 5,534,762 A | 7/1996 | Kim |
| 5,548,511 A | 8/1996 | Bancroft |
| 5,560,077 A | 10/1996 | Crotchett |
| 5,568,589 A | 10/1996 | Hwang |
| 5,621,291 A | 4/1997 | Lee |
| 5,634,237 A | 6/1997 | Paranjpe |
| 5,646,494 A | 7/1997 | Han |
| 5,666,689 A | 9/1997 | Andersen |
| 5,682,313 A | 10/1997 | Edlund |
| 5,682,640 A | 11/1997 | Han |
| 5,687,294 A | 11/1997 | Jeong |
| 5,698,957 A | 12/1997 | Sowada |
| 5,745,946 A | 5/1998 | Thrasher |
| 5,758,298 A | 5/1998 | Guldner |
| 5,778,554 A | 7/1998 | Jones |
| 5,781,960 A | 7/1998 | Kilstrom |
| 5,787,545 A | 8/1998 | Colens |
| 5,815,880 A | 10/1998 | Nakanishi |
| 5,825,981 A | 10/1998 | Matsuda |
| 5,841,259 A | 11/1998 | Kim |
| 5,852,984 A | 12/1998 | Matsuyama |
| 5,867,800 A | 2/1999 | Leif |
| 5,890,250 A | 4/1999 | Lange |
| 5,896,488 A | 4/1999 | Jeong |
| 5,903,124 A | 5/1999 | Kawakami |
| 5,926,909 A | 7/1999 | McGee |
| 5,933,902 A | 8/1999 | Frey |
| 5,935,179 A | 8/1999 | Kleiner |
| 5,940,927 A | 8/1999 | Haegermarck |
| 5,942,869 A | 8/1999 | Katou |
| 5,947,051 A | 9/1999 | Geiger |
| 5,959,423 A | 9/1999 | Nakanishi |
| 5,959,424 A | 9/1999 | Elkmann |
| 5,966,765 A | 10/1999 | Hamada |
| RE36,391 E | 11/1999 | vandenBerg |
| 5,983,833 A | 11/1999 | van der Lely |
| 5,987,696 A | 11/1999 | Wang |
| 5,991,951 A | 11/1999 | Kubo |
| 5,995,884 A | 11/1999 | Allen |
| 5,997,670 A | 12/1999 | Walter |
| 5,999,865 A | 12/1999 | Bloomquist |
| 6,012,470 A | 1/2000 | Jones |
| 6,024,107 A | 2/2000 | Jones |
| 6,064,926 A | 5/2000 | Sarangapani |
| 6,076,662 A | 6/2000 | Bahten |
| 6,082,377 A | 7/2000 | Frey |
| 6,124,694 A | 9/2000 | Bancroft |
| 6,142,252 A | 11/2000 | Kinto |
| 6,176,067 B1 | 1/2001 | Bahten |
| 6,213,136 B1 | 4/2001 | Jones |
| 6,226,830 B1 | 5/2001 | Hendriks |
| 6,230,360 B1 | 5/2001 | Singleton |
| 6,240,342 B1 | 5/2001 | Fiegert |
| 6,251,551 B1 | 6/2001 | Kunze-Concewitz |
| 6,255,793 B1 | 7/2001 | Peless |
| 6,263,989 B1 | 7/2001 | Won |
| 6,300,737 B1 | 10/2001 | Bergvall |
| 6,311,366 B1 | 11/2001 | Sepke |
| 6,327,741 B1 | 12/2001 | Reed |
| 6,339,735 B1 | 1/2002 | Peless |
| 6,358,325 B1 | 3/2002 | Andreas |
| 6,360,801 B1 | 3/2002 | Walter |
| 6,370,452 B1 | 4/2002 | Pfister |
| 6,370,453 B2 | 4/2002 | Sommer |
| 6,374,157 B1 | 4/2002 | Takamura |
| 6,381,801 B1 | 5/2002 | Clemons, Sr. |
| 6,389,329 B1 | 5/2002 | Colens |
| 6,413,149 B1 | 7/2002 | Wada |
| 6,417,641 B2 | 7/2002 | Peless |
| 6,431,296 B1 | 8/2002 | Won |
| 6,438,456 B1 | 8/2002 | Feddema |

(56) References Cited

U.S. PATENT DOCUMENTS

| | | |
|---|---|---|
| 6,443,509 B1 | 9/2002 | Levin |
| 6,457,199 B1 | 10/2002 | Frost |
| 6,457,206 B1 | 10/2002 | Judson |
| 6,459,955 B1 | 10/2002 | Bartsch |
| 6,465,982 B1 | 10/2002 | Bergvall |
| 6,481,515 B1 | 11/2002 | Kirkpatrick |
| 6,482,678 B1 | 11/2002 | Frost |
| 6,493,612 B1 | 12/2002 | Bisset |
| 6,493,613 B2 | 12/2002 | Peless |
| 6,496,754 B2 | 12/2002 | Song |
| 6,504,610 B1 | 1/2003 | Bauer |
| 6,519,804 B1 | 2/2003 | Vujik |
| 6,525,509 B1 | 2/2003 | Petersson |
| D471,243 S | 3/2003 | Cioffi |
| 6,532,404 B2 | 3/2003 | Colens |
| 6,535,793 B2 | 3/2003 | Allard |
| 6,571,415 B2 | 6/2003 | Gerber |
| 6,580,246 B2 | 6/2003 | Jacobs |
| 6,581,239 B1 | 6/2003 | Dyson |
| 6,594,844 B2 | 7/2003 | Jones |
| 6,597,143 B2 | 7/2003 | Song |
| 6,601,265 B1 | 8/2003 | Burlington |
| 6,605,156 B1 | 8/2003 | Clark |
| 6,609,962 B1 | 8/2003 | Wakabayashi |
| 6,611,120 B2 | 8/2003 | Song |
| 6,611,318 B2 | 8/2003 | LaPolice |
| 6,615,108 B1 | 9/2003 | Peless |
| 6,615,885 B1 | 9/2003 | Ohm |
| 6,633,150 B1 | 10/2003 | Wallach |
| 6,637,446 B2 | 10/2003 | Frost |
| 6,658,325 B2 | 12/2003 | Zweig |
| 6,661,239 B1 | 12/2003 | Ozick |
| 6,662,889 B2 | 12/2003 | De Fazio |
| 6,667,592 B2 | 12/2003 | Jacobs |
| 6,668,951 B2 | 12/2003 | Won |
| 6,671,592 B1 | 12/2003 | Bisset |
| 6,690,134 B1 | 2/2004 | Jones |
| 6,726,823 B1 | 4/2004 | Wang |
| 6,732,826 B2 | 5/2004 | Song |
| 6,745,431 B2 | 6/2004 | Dijksman |
| 6,748,297 B2 | 6/2004 | Song |
| 6,769,004 B2 | 7/2004 | Barrett |
| 6,774,596 B1 | 8/2004 | Bisset |
| 6,775,871 B1 | 8/2004 | Finch |
| 6,781,338 B2 | 8/2004 | Jones |
| 6,809,490 B2 | 10/2004 | Jones |
| 6,810,305 B2 | 10/2004 | Kirkpatrick, Jr. |
| 6,820,801 B2 | 11/2004 | Kaneko |
| 6,841,963 B2 | 1/2005 | Song |
| 6,845,297 B2 | 1/2005 | Allard |
| 6,850,024 B2 | 2/2005 | Peless |
| 6,859,010 B2 | 2/2005 | Jeon |
| 6,859,976 B2 | 3/2005 | Plankenhorn |
| 6,860,206 B1 | 3/2005 | Rudakevych |
| 6,868,307 B2 | 3/2005 | Song |
| 6,869,633 B2 | 3/2005 | Sus |
| 6,870,792 B2 | 3/2005 | Chiappetta |
| 6,882,334 B1 | 4/2005 | Meyer |
| 6,883,201 B2 | 4/2005 | Jones |
| 6,885,912 B2 | 4/2005 | Peless |
| 6,901,624 B2 | 6/2005 | Mori |
| 6,925,679 B2 | 8/2005 | Wallach |
| D510,066 S | 9/2005 | Hickey |
| 6,938,298 B2 | 9/2005 | Aasen |
| 6,939,208 B2 | 9/2005 | Kamimura |
| 6,940,291 B1 | 9/2005 | Ozick |
| 6,941,199 B1 | 9/2005 | Bottomley |
| 6,942,548 B2 | 9/2005 | Wada |
| 6,956,348 B2 | 10/2005 | Landry |
| 6,957,712 B2 | 10/2005 | Song |
| 6,964,312 B2 | 11/2005 | Maggio |
| 6,965,209 B2 | 11/2005 | Jones |
| 6,967,275 B2 | 11/2005 | Ozick |
| 6,971,140 B2 | 12/2005 | Kim |
| 6,971,141 B1 | 12/2005 | Tak |
| 6,984,952 B2 | 1/2006 | Peless |
| 7,000,623 B2 | 2/2006 | Welsh |
| 7,004,269 B2 | 2/2006 | Song |
| 7,013,200 B2 | 3/2006 | Wakui |
| 7,013,527 B2 | 3/2006 | Thomas, Sr. |
| 7,015,831 B2 | 3/2006 | Karlsson |
| 7,024,278 B2 | 4/2006 | Chiappetta |
| 7,031,805 B2 | 4/2006 | Lee |
| 7,040,968 B2 | 5/2006 | Kamimura |
| 7,042,342 B2 | 5/2006 | Luo |
| 7,043,794 B2 | 5/2006 | Conner |
| 7,050,926 B2 | 5/2006 | Theurer |
| 7,053,578 B2 | 5/2006 | Diehl |
| 7,053,580 B2 | 5/2006 | Aldred |
| 7,054,716 B2 | 5/2006 | McKee |
| 7,059,012 B2 | 6/2006 | Song |
| 7,079,923 B2 | 7/2006 | Abramson |
| 7,082,350 B2 | 7/2006 | Skoog |
| D526,753 S | 8/2006 | Tani |
| 7,085,624 B2 | 8/2006 | Aldred |
| 7,103,449 B2 | 9/2006 | Woo |
| 7,113,847 B2 | 9/2006 | Chmura |
| 7,117,067 B2 | 10/2006 | McLurkin |
| 7,133,745 B2 | 11/2006 | Wang |
| 7,134,164 B2 | 11/2006 | Alton |
| 7,135,992 B2 | 11/2006 | Karlsson |
| 7,143,696 B2 | 12/2006 | Rudakevych |
| 7,145,478 B2 | 12/2006 | Goncalves |
| 7,150,068 B1 | 12/2006 | Ragner |
| 7,155,308 B2 | 12/2006 | Jones |
| 7,155,309 B2 | 12/2006 | Peless |
| 7,162,338 B2 | 1/2007 | Goncalves |
| 7,167,775 B2 | 1/2007 | Abramson |
| 7,173,391 B2 | 2/2007 | Jones |
| 7,174,238 B1 | 2/2007 | Zweig |
| 7,177,737 B2 | 2/2007 | Karlsson |
| 7,184,586 B2 | 2/2007 | Jeon |
| 7,185,396 B2 | 3/2007 | Im |
| 7,185,397 B2 | 3/2007 | Stuchlik |
| 7,188,000 B2 | 3/2007 | Chiappetta |
| 7,196,487 B2 | 3/2007 | Jones |
| 7,199,711 B2 | 4/2007 | Field |
| 7,200,892 B2 | 4/2007 | Kim |
| 7,202,630 B2 | 4/2007 | Dan |
| 7,206,677 B2 | 4/2007 | Hulden |
| 7,207,081 B2 | 4/2007 | Gerber |
| 7,208,892 B2 | 4/2007 | Tondra |
| 7,213,298 B2 | 5/2007 | Cipolla |
| 7,213,663 B2 | 5/2007 | Kim |
| 7,222,390 B2 | 5/2007 | Cipolla |
| 7,225,500 B2 | 6/2007 | Diehl |
| 7,237,298 B2 | 7/2007 | Reindle |
| 7,240,396 B2 | 7/2007 | Thomas, Sr. |
| 7,246,405 B2 | 7/2007 | Yan |
| 7,248,951 B2 | 7/2007 | Hulden |
| 7,251,853 B2 | 8/2007 | Park |
| 7,254,464 B1 | 8/2007 | McLurkin |
| 7,254,859 B2 | 8/2007 | Gerber |
| 7,269,877 B2 | 9/2007 | Tondra |
| 7,272,467 B2 | 9/2007 | Goncalves |
| 7,272,868 B2 | 9/2007 | Im |
| 7,274,167 B2 | 9/2007 | Kim |
| 7,275,280 B2 | 10/2007 | Haegermarck |
| 7,288,912 B2 | 10/2007 | Landry |
| D556,961 S | 12/2007 | Swyst |
| 7,303,776 B2 | 12/2007 | Sus |
| 7,324,870 B2 | 1/2008 | Lee |
| 7,331,436 B1 | 2/2008 | Pack |
| 7,332,890 B2 | 2/2008 | Cohen |
| 7,343,221 B2 | 3/2008 | Ann |
| 7,343,719 B2 | 3/2008 | Sus |
| 7,346,428 B1 | 3/2008 | Huffman |
| 7,349,759 B2 | 3/2008 | Peless |
| 7,359,766 B2 | 4/2008 | Jeon |
| 7,363,994 B1 | 4/2008 | DeFazio |
| 7,369,460 B2 | 5/2008 | Chiappetta |
| 7,372,004 B2 | 5/2008 | Buchner |
| 7,388,343 B2 | 6/2008 | Jones |
| 7,389,156 B2 | 6/2008 | Ziegler |

(56) References Cited

U.S. PATENT DOCUMENTS

| | | |
|---|---|---|
| 7,389,166 B2 | 6/2008 | Harwig |
| 7,402,974 B2 | 7/2008 | Jeon |
| 7,403,360 B2 | 7/2008 | Cunningham |
| 7,412,748 B2 | 8/2008 | Lee |
| 7,417,404 B2 | 8/2008 | Lee |
| 7,418,762 B2 | 9/2008 | Arai |
| 7,424,766 B2 | 9/2008 | Reindle |
| 7,429,843 B2 | 9/2008 | Jones |
| 7,430,455 B2 | 9/2008 | Casey |
| 7,438,766 B2 | 10/2008 | Song |
| 7,441,298 B2 | 10/2008 | Svendsen |
| 7,444,206 B2 | 10/2008 | Abramson |
| 7,448,113 B2 | 11/2008 | Jones |
| 7,459,871 B2 | 12/2008 | Landry |
| 7,464,157 B2 | 12/2008 | Okude |
| 7,474,941 B2 | 1/2009 | Kim |
| 7,480,958 B2 | 1/2009 | Song |
| 7,480,960 B2 | 1/2009 | Kim |
| D586,959 S | 2/2009 | Geringer |
| 7,489,277 B2 | 2/2009 | Sung |
| 7,489,985 B2 | 2/2009 | Ko |
| 7,499,774 B2 | 3/2009 | Barrett |
| 7,499,775 B2 | 3/2009 | Filippov |
| 7,499,776 B2 | 3/2009 | Allard |
| 7,499,804 B2 | 3/2009 | Svendsen |
| 7,503,096 B2 | 3/2009 | Lin |
| 7,515,991 B2 | 4/2009 | Egawa |
| D593,265 S | 5/2009 | Carr |
| 7,539,557 B2 | 5/2009 | Yamauchi |
| 7,546,891 B2 | 6/2009 | Won |
| 7,546,912 B1 | 6/2009 | Pack |
| 7,555,363 B2 | 6/2009 | Augenbraun |
| 7,556,108 B2 | 7/2009 | Won |
| 7,559,269 B2 | 7/2009 | Rudakevych |
| 7,564,571 B2 | 7/2009 | Karabassi |
| 7,566,839 B2 | 7/2009 | Hukuba |
| 7,567,052 B2 | 7/2009 | Jones |
| 7,568,259 B2 | 8/2009 | Yan |
| 7,568,536 B2 | 8/2009 | Yu |
| 7,571,511 B2 | 8/2009 | Jones |
| 7,573,403 B2 | 8/2009 | Goncalves |
| 7,574,282 B2 | 8/2009 | Petersson |
| 7,578,020 B2 | 8/2009 | Jaworski |
| 7,579,803 B2 | 8/2009 | Jones |
| 7,581,282 B2 | 9/2009 | Woo |
| 7,597,162 B2 | 10/2009 | Won |
| 7,600,521 B2 | 10/2009 | Woo |
| 7,600,593 B2 | 10/2009 | Filippov |
| 7,603,744 B2 | 10/2009 | Reindle |
| 7,604,675 B2 | 10/2009 | Makarov |
| 7,610,651 B2 | 11/2009 | Baek |
| 7,613,543 B2 | 11/2009 | Petersson |
| 7,620,476 B2 | 11/2009 | Morse |
| 7,636,982 B2 | 12/2009 | Jones |
| 7,647,144 B2 | 1/2010 | Haegermarck |
| 7,650,666 B2 | 1/2010 | Jang |
| 7,654,348 B2 | 2/2010 | Ohm |
| 7,660,650 B2 | 2/2010 | Kawagoe |
| 7,663,333 B2 | 2/2010 | Jones |
| 7,673,367 B2 | 3/2010 | Kim |
| 7,679,532 B2 | 3/2010 | Karlsson |
| 7,688,676 B2 | 3/2010 | Chiappetta |
| 7,693,654 B1 | 4/2010 | Dietsch |
| 7,697,141 B2 | 4/2010 | Jones |
| 7,706,917 B1 | 4/2010 | Chiappetta |
| 7,706,921 B2 | 4/2010 | Jung |
| 7,709,497 B2 | 5/2010 | Christensen, IV |
| 7,711,450 B2 | 5/2010 | Im |
| 7,720,572 B2 | 5/2010 | Ziegler |
| 7,721,829 B2 | 5/2010 | Lee |
| 7,729,801 B2 | 6/2010 | Abramson |
| 7,749,294 B2 | 7/2010 | Oh |
| 7,751,940 B2 | 7/2010 | Lee |
| 7,761,954 B2 | 7/2010 | Ziegler |
| 7,765,635 B2 | 8/2010 | Park |
| 7,765,638 B2 | 8/2010 | Pineschi |
| 7,769,490 B2 | 8/2010 | Abramson |
| 7,774,158 B2 | 8/2010 | Domingues Goncalves |
| 7,779,504 B2 | 8/2010 | Lee |
| 7,780,796 B2 | 8/2010 | Shim |
| 7,784,139 B2 | 8/2010 | Sawalski |
| 7,784,570 B2 | 8/2010 | Couture |
| 7,785,544 B2 | 8/2010 | Alward |
| 7,787,991 B2 | 8/2010 | Jeung |
| 7,793,614 B2 | 9/2010 | Ericsson |
| 7,801,645 B2 | 9/2010 | Taylor |
| 7,805,220 B2 | 9/2010 | Taylor |
| 7,827,653 B1 | 11/2010 | Liu |
| 7,832,048 B2 | 11/2010 | Harwig |
| 7,835,529 B2 | 11/2010 | Hernandez |
| 7,843,431 B2 | 11/2010 | Robbins |
| 7,844,364 B2 | 11/2010 | McLurkin |
| 7,849,555 B2 | 12/2010 | Hahm |
| 7,856,291 B2 | 12/2010 | Jung |
| 7,860,608 B2 | 12/2010 | Lee |
| 7,861,365 B2 | 1/2011 | Sun |
| 7,861,366 B2 | 1/2011 | Hahm |
| 7,873,437 B2 | 1/2011 | Aldred |
| 7,877,166 B2 | 1/2011 | Harwig |
| 7,886,399 B2 | 2/2011 | Dayton |
| 7,890,210 B2 | 2/2011 | Choi |
| 7,891,045 B2 | 2/2011 | Kim |
| 7,891,289 B2 | 2/2011 | Day |
| 7,891,446 B2 | 2/2011 | Couture |
| 7,894,951 B2 | 2/2011 | Norris |
| 7,916,931 B2 | 3/2011 | Lee |
| 7,920,941 B2 | 4/2011 | Park |
| 7,921,506 B2 | 4/2011 | Baek |
| 7,926,598 B2 | 4/2011 | Rudakevych |
| 7,934,571 B2 | 5/2011 | Chiu |
| 7,937,800 B2 | 5/2011 | Yan |
| 7,942,107 B2 | 5/2011 | Vosburgh |
| 7,957,837 B2 | 6/2011 | Ziegler |
| 7,962,997 B2 | 6/2011 | Chung |
| 7,966,339 B2 | 6/2011 | Kim |
| 7,975,790 B2 | 7/2011 | Kim |
| 7,979,175 B2 | 7/2011 | Allard |
| 7,979,945 B2 | 7/2011 | Dayton |
| 7,981,455 B2 | 7/2011 | Sus |
| 7,997,118 B2 | 8/2011 | Mecca |
| 8,001,651 B2 | 8/2011 | Chang |
| 8,007,221 B1 | 8/2011 | More |
| 8,010,229 B2 | 8/2011 | Kim |
| 8,019,223 B2 | 9/2011 | Hudson |
| 8,020,657 B2 | 9/2011 | Allard |
| 8,032,978 B2 | 10/2011 | Haegermarck |
| 8,034,390 B2 | 10/2011 | Sus |
| 8,042,663 B1 | 10/2011 | Pack |
| 8,046,103 B2 | 10/2011 | Abramson |
| 8,061,461 B2 | 11/2011 | Couture |
| 8,065,778 B2 | 11/2011 | Kim |
| 8,073,439 B2 | 12/2011 | Stromberg |
| 8,074,752 B2 | 12/2011 | Rudakevych |
| 8,078,338 B2 | 12/2011 | Pack |
| 8,079,432 B2 | 12/2011 | Ohm |
| 8,082,836 B2 | 12/2011 | More |
| 8,086,419 B2 | 12/2011 | Goncalves |
| 8,087,117 B2 | 1/2012 | Kapoor |
| 8,095,238 B2 | 1/2012 | Jones |
| 8,095,336 B2 | 1/2012 | Goncalves |
| 8,107,318 B2 | 1/2012 | Chiappetta |
| 8,108,092 B2 | 1/2012 | Phillips |
| 8,109,191 B1 | 2/2012 | Rudakevych |
| 8,112,942 B2 | 2/2012 | Bohm |
| 8,113,304 B2 | 2/2012 | Won |
| 8,122,982 B2 | 2/2012 | Morey |
| 8,127,396 B2 | 3/2012 | Mangiardi |
| 8,127,399 B2 | 3/2012 | Dilger |
| 8,127,704 B2 | 3/2012 | Vosburgh |
| 8,136,200 B2 | 3/2012 | Splinter |
| 8,150,650 B2 | 4/2012 | Goncalves |
| D659,311 S | 5/2012 | Geringer |
| 8,166,904 B2 | 5/2012 | Israel |
| 8,195,333 B2 | 6/2012 | Ziegler |

(56) References Cited

U.S. PATENT DOCUMENTS

| | | |
|---|---|---|
| 8,196,251 B2 | 6/2012 | Lynch |
| 8,199,109 B2 | 6/2012 | Robbins |
| 8,200,600 B2 | 6/2012 | Rosenstein |
| 8,200,700 B2 | 6/2012 | Moore |
| 8,237,389 B2 | 8/2012 | Fitch |
| 8,237,920 B2 | 8/2012 | Jones |
| 8,239,992 B2 | 8/2012 | Schnittman |
| 8,244,469 B2 | 8/2012 | Cheung |
| 8,253,368 B2 | 8/2012 | Landry |
| 8,255,092 B2 | 8/2012 | Phillips |
| 8,256,542 B2 | 9/2012 | Couture |
| 8,265,793 B2 | 9/2012 | Cross |
| 8,274,406 B2 | 9/2012 | Karlsson |
| 8,281,703 B2 | 10/2012 | Moore |
| 8,281,731 B2 | 10/2012 | Vosburgh |
| 8,290,619 B2 | 10/2012 | McLurkin |
| 8,292,007 B2 | 10/2012 | DeFazio |
| 8,295,125 B2 | 10/2012 | Chiappetta |
| D670,877 S | 11/2012 | Geringer |
| 8,308,529 B2 | 11/2012 | DAmbra |
| 8,311,674 B2 | 11/2012 | Abramson |
| 8,316,971 B2 | 11/2012 | Couture |
| 8,318,499 B2 | 11/2012 | Fritchie |
| D672,928 S | 12/2012 | Swett |
| 8,322,470 B2 | 12/2012 | Ohm |
| 8,326,469 B2 | 12/2012 | Phillips |
| 8,327,960 B2 | 12/2012 | Couture |
| 8,336,479 B2 | 12/2012 | Vosburgh |
| 8,342,271 B2 | 1/2013 | Filippov |
| 8,347,088 B2 | 1/2013 | Moore |
| 8,347,444 B2 | 1/2013 | Schnittman |
| 8,350,810 B2 | 1/2013 | Robbins |
| 8,353,373 B2 | 1/2013 | Rudakevych |
| 8,364,309 B1 | 1/2013 | Bailey |
| 8,364,310 B2 | 1/2013 | Jones |
| 8,365,848 B2 | 2/2013 | Won |
| 8,368,339 B2 | 2/2013 | Jones |
| 8,370,985 B2 | 2/2013 | Schnittman |
| 8,374,721 B2 | 2/2013 | Halloran |
| 8,375,838 B2 | 2/2013 | Rudakevych |
| 8,378,613 B2 | 2/2013 | Landry |
| 8,380,350 B2 | 2/2013 | Ozick |
| 8,382,906 B2 | 2/2013 | Konandreas |
| 8,386,081 B2 | 2/2013 | Landry |
| 8,387,193 B2 | 3/2013 | Ziegler |
| 8,390,251 B2 | 3/2013 | Cohen |
| 8,392,021 B2 | 3/2013 | Konandreas |
| 8,396,592 B2 | 3/2013 | Jones |
| 8,396,611 B2 | 3/2013 | Phillips |
| 8,402,586 B2 | 3/2013 | Lavabre |
| 8,408,956 B1 | 4/2013 | Vosburgh |
| 8,412,377 B2 | 4/2013 | Casey |
| 8,413,752 B2 | 4/2013 | Page |
| 8,417,188 B1 | 4/2013 | Vosburgh |
| 8,417,383 B2 | 4/2013 | Ozick |
| 8,418,303 B2 | 4/2013 | Kapoor |
| 8,418,642 B2 | 4/2013 | Vosburgh |
| 8,428,778 B2 | 4/2013 | Landry |
| 8,433,442 B2 | 4/2013 | Friedman |
| D682,362 S | 5/2013 | Mozeika |
| 8,438,694 B2 | 5/2013 | Kim |
| 8,438,695 B2 | 5/2013 | Gilbert, Jr. |
| 8,438,698 B2 | 5/2013 | Kim |
| 8,447,440 B2 | 5/2013 | Phillips |
| 8,447,613 B2 | 5/2013 | Hussey |
| 8,452,448 B2 | 5/2013 | Pack |
| 8,453,289 B2 | 6/2013 | Lynch |
| 8,456,125 B2 | 6/2013 | Landry |
| 8,461,803 B2 | 6/2013 | Cohen |
| 8,463,438 B2 | 6/2013 | Jones |
| 8,473,140 B2 | 6/2013 | Norris |
| 8,474,090 B2 | 7/2013 | Jones |
| 8,478,442 B2 | 7/2013 | Casey |
| 8,485,330 B2 | 7/2013 | Pack |
| 8,505,158 B2 | 8/2013 | Han |
| 8,508,388 B2 | 8/2013 | Karlsson |
| 8,515,578 B2 | 8/2013 | Chiappetta |
| 8,516,651 B2 | 8/2013 | Jones |
| 8,525,995 B2 | 9/2013 | Jones |
| 8,527,113 B2 | 9/2013 | Yamauchi |
| 8,528,157 B2 | 9/2013 | Schnittman |
| 8,528,162 B2 | 9/2013 | Tang |
| 8,528,673 B2 | 9/2013 | More |
| 8,532,822 B2 | 9/2013 | Abramson |
| 8,533,144 B1 | 9/2013 | Reeser |
| 8,534,983 B2 | 9/2013 | Schoenfeld |
| 8,543,562 B2 | 9/2013 | Mule |
| 8,548,626 B2 | 10/2013 | Steltz |
| 8,551,254 B2 | 10/2013 | Dayton |
| 8,551,421 B2 | 10/2013 | Luchinger |
| 8,565,920 B2 | 10/2013 | Casey |
| 8,572,799 B2 | 11/2013 | Won |
| 8,584,305 B2 | 11/2013 | Won |
| 8,584,306 B2 | 11/2013 | Chung |
| 8,584,307 B2 | 11/2013 | Won |
| 8,594,840 B1 | 11/2013 | Chiappetta |
| 8,598,829 B2 | 12/2013 | Landry |
| 8,599,645 B2 | 12/2013 | Chiappetta |
| 8,600,553 B2 | 12/2013 | Svendsen |
| 8,606,401 B2 | 12/2013 | Ozick |
| 8,634,956 B1 | 1/2014 | Chiappetta |
| 8,634,958 B1 | 1/2014 | Chiappetta |
| 8,666,523 B2 | 3/2014 | Kim |
| 8,671,513 B2 | 3/2014 | Yoo |
| 8,732,895 B2 | 5/2014 | Cunningham |
| 8,741,013 B2 | 6/2014 | Swett |
| 8,743,286 B2 | 6/2014 | Hasegawa |
| 8,745,194 B2 | 6/2014 | Uribe-Etxebarria Jimenez |
| 8,755,936 B2 | 6/2014 | Friedman |
| 8,761,931 B2 | 6/2014 | Halloran |
| 8,763,200 B2 | 7/2014 | Kim |
| 8,774,970 B2 | 7/2014 | Knopow |
| 8,780,342 B2 | 7/2014 | Dibernardo |
| 8,798,791 B2 | 8/2014 | Li |
| 8,798,792 B2 | 8/2014 | Park |
| 8,799,258 B2 | 8/2014 | Mule |
| 8,838,274 B2 | 9/2014 | Jones |
| 8,839,477 B2 | 9/2014 | Schnittman |
| 8,843,245 B2 | 9/2014 | Choe |
| 8,855,914 B1 | 10/2014 | Alexander |
| 8,874,264 B1 | 10/2014 | Chiappetta |
| 8,880,342 B2 | 11/2014 | Ando |
| 8,881,339 B2 | 11/2014 | Gilbert |
| 8,924,042 B2 | 12/2014 | Kim |
| 8,961,695 B2 | 2/2015 | Romanov |
| 8,985,127 B2 | 3/2015 | Konandreas |
| 8,996,172 B2 | 3/2015 | Shah |
| 9,033,079 B2 | 5/2015 | Shin |
| 9,037,396 B2 | 5/2015 | Pack |
| 9,052,721 B1 | 6/2015 | Dowdall |
| 9,104,206 B2 | 8/2015 | Biber |
| 9,144,361 B2 | 9/2015 | Landry |
| 9,215,957 B2 | 12/2015 | Cohen |
| 9,259,129 B2 | 2/2016 | Jang |
| 9,360,300 B2 | 6/2016 | DiBernado |
| 9,392,920 B2 | 7/2016 | Halloran |
| 9,436,318 B2 | 9/2016 | Omura |
| 9,468,352 B2 | 10/2016 | Klüssendorff |
| 9,550,294 B2 | 1/2017 | Cohen |
| 9,596,971 B2 | 3/2017 | Yoon |
| 9,629,514 B2 | 4/2017 | Hillen |
| 9,687,132 B2 | 6/2017 | Schlischka |
| 9,717,387 B1 | 8/2017 | Szatmary et al. |
| 9,939,529 B2 | 4/2018 | Haegermarck |
| 9,999,328 B2 | 6/2018 | Vvanderstegen-Drake |
| 10,045,675 B2 | 8/2018 | Haegermarck |
| 10,105,841 B1 | 10/2018 | Szatmary et al. |
| 10,247,669 B2 | 4/2019 | Windorfer |
| 10,296,007 B2 | 5/2019 | Vicenti |
| 10,365,659 B2 | 7/2019 | Park et al. |
| 10,639,793 B2 | 5/2020 | Williams et al. |
| 2001/0004719 A1 | 6/2001 | Sommer |
| 2001/0037163 A1 | 11/2001 | Allard |
| 2002/0016649 A1 | 2/2002 | Jones |

(56) References Cited

U.S. PATENT DOCUMENTS

| | | |
|---|---|---|
| 2002/0091466 A1 | 7/2002 | Song |
| 2002/0108635 A1 | 8/2002 | Marrero |
| 2002/0121288 A1 | 9/2002 | Marrero |
| 2002/0121561 A1 | 9/2002 | Marrero |
| 2002/0153185 A1 | 10/2002 | Song |
| 2002/0164932 A1 | 11/2002 | Kamimura |
| 2002/0174506 A1 | 11/2002 | Wallach |
| 2002/0185071 A1 | 12/2002 | Guo |
| 2002/0189871 A1 | 12/2002 | Won |
| 2003/0000034 A1 | 1/2003 | Welsh |
| 2003/0025472 A1 | 2/2003 | Jones |
| 2003/0030398 A1 | 2/2003 | Jacobs |
| 2003/0120972 A1 | 6/2003 | Matsushima |
| 2003/0140449 A1 | 7/2003 | Alton |
| 2003/0159223 A1 | 8/2003 | Plankenhorn |
| 2003/0167000 A1 | 9/2003 | Mullick |
| 2003/0229421 A1 | 12/2003 | Chmura |
| 2004/0020000 A1 | 2/2004 | Jones |
| 2004/0031111 A1 | 2/2004 | Porchia |
| 2004/0031121 A1 | 2/2004 | Martin |
| 2004/0034952 A1 | 2/2004 | Ho |
| 2004/0049877 A1 | 3/2004 | Jones |
| 2004/0049878 A1 | 3/2004 | Thomas |
| 2004/0074038 A1 | 4/2004 | Im |
| 2004/0074039 A1 | 4/2004 | Kim |
| 2004/0088081 A1 | 5/2004 | Song et al. |
| 2004/0098167 A1 | 5/2004 | Yi |
| 2004/0111184 A1 | 6/2004 | Chiappetta |
| 2004/0111827 A1 | 6/2004 | Im |
| 2004/0167667 A1 | 8/2004 | Goncalves |
| 2004/0181896 A1 | 9/2004 | Egawa |
| 2004/0182839 A1 | 9/2004 | Denney |
| 2004/0182840 A1 | 9/2004 | Denney |
| 2004/0185011 A1 | 9/2004 | Alexander |
| 2004/0187249 A1 | 9/2004 | Jones |
| 2004/0207355 A1 | 10/2004 | Jones |
| 2004/0208212 A1 | 10/2004 | Denney |
| 2004/0210343 A1 | 10/2004 | Kim |
| 2004/0220707 A1 | 11/2004 | Pallister |
| 2005/0000543 A1 | 1/2005 | Taylor |
| 2005/0010331 A1 | 1/2005 | Taylor |
| 2005/0015912 A1 | 1/2005 | Kim |
| 2005/0015915 A1 | 1/2005 | Thomas |
| 2005/0021181 A1 | 1/2005 | Kim |
| 2005/0028315 A1 | 2/2005 | Thomas |
| 2005/0028316 A1 | 2/2005 | Thomas |
| 2005/0042151 A1 | 2/2005 | Alward |
| 2005/0046373 A1 | 3/2005 | Aldred |
| 2005/0065662 A1 | 3/2005 | Reindle |
| 2005/0085947 A1 | 4/2005 | Aldred |
| 2005/0088643 A1 | 4/2005 | Anderson |
| 2005/0156562 A1 | 7/2005 | Cohen |
| 2005/0166354 A1 | 8/2005 | Uehigashi |
| 2005/0172435 A1 | 8/2005 | Bernini |
| 2005/0191949 A1 | 9/2005 | Kamimura |
| 2005/0217061 A1 | 10/2005 | Reindle |
| 2005/0223514 A1 | 10/2005 | Stuchlik |
| 2005/0229338 A1 | 10/2005 | Kashiwagi |
| 2005/0229340 A1 | 10/2005 | Sawalski |
| 2005/0230166 A1 | 10/2005 | Petersson |
| 2005/0234611 A1 | 10/2005 | Uehigashi |
| 2005/0251292 A1 | 11/2005 | Casey |
| 2005/0251457 A1 | 11/2005 | Kashiwagi |
| 2005/0251947 A1 | 11/2005 | Lee |
| 2005/0267629 A1 | 12/2005 | Petersson |
| 2005/0267631 A1 | 12/2005 | Lee et al. |
| 2005/0278888 A1 | 12/2005 | Reindle |
| 2005/0287038 A1 | 12/2005 | Dubrovsky |
| 2006/0006316 A1 | 1/2006 | Takenaka |
| 2006/0009879 A1 | 1/2006 | Lynch |
| 2006/0010799 A1 | 1/2006 | Bohm |
| 2006/0020369 A1 | 1/2006 | Taylor |
| 2006/0020370 A1 | 1/2006 | Abramson |
| 2006/0028306 A1 | 2/2006 | Hukuba |
| 2006/0032013 A1 | 2/2006 | Kim |
| 2006/0045981 A1 | 3/2006 | Tsushi |
| 2006/0076039 A1 | 4/2006 | Song |
| 2006/0095158 A1 | 5/2006 | Lee |
| 2006/0136096 A1 | 6/2006 | Chiappetta |
| 2006/0144834 A1 | 7/2006 | Denney |
| 2006/0178777 A1 | 8/2006 | Park |
| 2006/0190133 A1 | 8/2006 | Konandreas |
| 2006/0190134 A1 | 8/2006 | Ziegler |
| 2006/0190146 A1 | 8/2006 | Morse |
| 2006/0195015 A1 | 8/2006 | Mullick |
| 2006/0200281 A1 | 9/2006 | Ziegler |
| 2006/0213025 A1 | 9/2006 | Sawalski |
| 2006/0235570 A1 | 10/2006 | Jung |
| 2006/0235585 A1 | 10/2006 | Tanaka |
| 2006/0236492 A1 | 10/2006 | Sudo |
| 2006/0237037 A1 | 10/2006 | Kim |
| 2006/0288519 A1 | 12/2006 | Jaworski |
| 2006/0293788 A1 | 12/2006 | Pogodin |
| 2007/0016328 A1 | 1/2007 | Ziegler |
| 2007/0021867 A1 | 1/2007 | Woo |
| 2007/0059441 A1 | 3/2007 | Greer |
| 2007/0061040 A1 | 3/2007 | Augenbraun |
| 2007/0114975 A1 | 5/2007 | Cohen |
| 2007/0118248 A1 | 5/2007 | Lee |
| 2007/0124890 A1 | 6/2007 | Erko |
| 2007/0143950 A1 | 6/2007 | Lin |
| 2007/0156286 A1 | 7/2007 | Yamauchi |
| 2007/0179670 A1 | 8/2007 | Chiappetta |
| 2007/0189347 A1 | 8/2007 | Denney |
| 2007/0204426 A1 | 9/2007 | Nakagawa |
| 2007/0213892 A1 | 9/2007 | Jones |
| 2007/0214601 A1 | 9/2007 | Chung |
| 2007/0234492 A1 | 10/2007 | Svendsen |
| 2007/0244610 A1 | 10/2007 | Ozick |
| 2007/0250212 A1 | 10/2007 | Halloran |
| 2007/0266508 A1 | 11/2007 | Jones |
| 2007/0267230 A1 | 11/2007 | Won |
| 2007/0267570 A1 | 11/2007 | Park |
| 2007/0267998 A1 | 11/2007 | Cohen |
| 2007/0273864 A1 | 11/2007 | Cho |
| 2007/0276541 A1 | 11/2007 | Sawasaki |
| 2007/0285041 A1 | 12/2007 | Jones |
| 2007/0289267 A1 | 12/2007 | Makarov |
| 2007/0290649 A1 | 12/2007 | Jones |
| 2008/0000041 A1 | 1/2008 | Jones |
| 2008/0000042 A1 | 1/2008 | Jones |
| 2008/0001566 A1 | 1/2008 | Jones |
| 2008/0007203 A1 | 1/2008 | Cohen |
| 2008/0009964 A1 | 1/2008 | Bruemmer |
| 2008/0015738 A1 | 1/2008 | Casey |
| 2008/0016631 A1 | 1/2008 | Casey |
| 2008/0037170 A1 | 2/2008 | Saliba |
| 2008/0039974 A1 | 2/2008 | Sandin |
| 2008/0047092 A1 | 2/2008 | Schnittman |
| 2008/0051953 A1 | 2/2008 | Jones |
| 2008/0007193 A1 | 3/2008 | Bow |
| 2008/0052846 A1 | 3/2008 | Kapoor |
| 2008/0058987 A1 | 3/2008 | Ozick |
| 2008/0063400 A1 | 3/2008 | Hudson |
| 2008/0065265 A1 | 3/2008 | Ozick |
| 2008/0065347 A1 | 3/2008 | Lavarec et al. |
| 2008/0077278 A1 | 3/2008 | Park |
| 2008/0079383 A1 | 4/2008 | Nakamoto |
| 2008/0084174 A1 | 4/2008 | Jones |
| 2008/0086241 A1 | 4/2008 | Phillips |
| 2008/0091304 A1 | 4/2008 | Ozick |
| 2008/0091305 A1 | 4/2008 | Svendsen |
| 2008/0093131 A1 | 4/2008 | Couture |
| 2008/0098553 A1 | 5/2008 | Dayton |
| 2008/0105445 A1 | 5/2008 | Dayton |
| 2008/0109126 A1 | 5/2008 | Sandin |
| 2008/0121097 A1 | 5/2008 | Rudakevych |
| 2008/0127445 A1 | 6/2008 | Konandreas |
| 2008/0127446 A1 | 6/2008 | Ziegler |
| 2008/0133052 A1 | 6/2008 | Jones |
| 2008/0134457 A1 | 6/2008 | Morse |
| 2008/0134458 A1 | 6/2008 | Ziegler |
| 2008/0140255 A1 | 6/2008 | Ziegler |
| 2008/0143063 A1 | 6/2008 | Won |

(56) References Cited

U.S. PATENT DOCUMENTS

| | | |
|---|---|---|
| 2008/0143064 A1 | 6/2008 | Won |
| 2008/0143065 A1 | 6/2008 | DeFazio |
| 2008/0152871 A1 | 6/2008 | Greer |
| 2008/0155768 A1 | 7/2008 | Ziegler |
| 2008/0179115 A1 | 7/2008 | Ohm |
| 2008/0183332 A1 | 7/2008 | Ohm |
| 2008/0184518 A1 | 8/2008 | Taylor |
| 2008/0196946 A1 | 8/2008 | Filippov |
| 2008/0205194 A1 | 8/2008 | Chiappetta |
| 2008/0209665 A1 | 9/2008 | Mangiardi |
| 2008/0221729 A1 | 9/2008 | Lavarec |
| 2008/0223630 A1 | 9/2008 | Couture |
| 2008/0235897 A1 | 10/2008 | Kim |
| 2008/0236907 A1 | 10/2008 | Won |
| 2008/0264456 A1 | 10/2008 | Lynch |
| 2008/0266254 A1 | 10/2008 | Robbins |
| 2008/0276407 A1 | 11/2008 | Schnittman |
| 2008/0276408 A1 | 11/2008 | Gilbert |
| 2008/0281470 A1 | 11/2008 | Gilbert |
| 2008/0282494 A1 | 11/2008 | Won |
| 2008/0294288 A1 | 11/2008 | Yamauchi |
| 2008/0307590 A1 | 12/2008 | Jones |
| 2009/0007366 A1 | 1/2009 | Svendsen |
| 2009/0025155 A1 | 1/2009 | Nishiyama |
| 2009/0030551 A1 | 1/2009 | Hein |
| 2009/0037024 A1 | 2/2009 | Jamieson |
| 2009/0038089 A1 | 2/2009 | Landry |
| 2009/0044370 A1 | 2/2009 | Won |
| 2009/0045766 A1 | 2/2009 | Casey |
| 2009/0055022 A1 | 2/2009 | Casey |
| 2009/0065271 A1 | 3/2009 | Won |
| 2009/0070946 A1 | 3/2009 | Tamada |
| 2009/0078035 A1 | 3/2009 | Mecca |
| 2009/0107738 A1 | 4/2009 | Won |
| 2009/0125175 A1 | 5/2009 | Park |
| 2009/0126143 A1 | 5/2009 | Haegermarck |
| 2009/0133720 A1 | 5/2009 | Vandenbogert |
| 2009/0145671 A1 | 6/2009 | Filippov |
| 2009/0173553 A1 | 7/2009 | Won |
| 2009/0180668 A1 | 7/2009 | Jones |
| 2009/0226113 A1 | 9/2009 | Matsumoto |
| 2009/0232506 A1 | 9/2009 | Hudson |
| 2009/0241826 A1 | 10/2009 | Vosburgh |
| 2009/0254217 A1 | 10/2009 | Pack |
| 2009/0254218 A1 | 10/2009 | Sandin |
| 2009/0265036 A1 | 10/2009 | Jamieson |
| 2009/0270015 A1 | 10/2009 | DAmbra |
| 2009/0274602 A1 | 11/2009 | Alward |
| 2009/0281661 A1 | 11/2009 | Dooley |
| 2009/0292393 A1 | 11/2009 | Casey |
| 2009/0292884 A1 | 11/2009 | Wang |
| 2009/0314318 A1 | 12/2009 | Chang |
| 2009/0314554 A1 | 12/2009 | Couture |
| 2009/0319083 A1 | 12/2009 | Jones |
| 2010/0001478 A1 | 1/2010 | DeFazio |
| 2010/0011529 A1 | 1/2010 | Won |
| 2010/0037418 A1 | 2/2010 | Hussey |
| 2010/0049364 A1 | 2/2010 | Landry |
| 2010/0049365 A1 | 2/2010 | Jones |
| 2010/0049391 A1 | 2/2010 | Nakano |
| 2010/0054129 A1 | 3/2010 | Kuik |
| 2010/0063628 A1 | 3/2010 | Landry |
| 2010/0075054 A1 | 3/2010 | Kaneyama |
| 2010/0076600 A1 | 3/2010 | Cross |
| 2010/0078415 A1 | 4/2010 | Denney |
| 2010/0082193 A1 | 4/2010 | Chiappetta |
| 2010/0107355 A1 | 5/2010 | Won |
| 2010/0108098 A1 | 5/2010 | Splinter |
| 2010/0115716 A1 | 5/2010 | Landry |
| 2010/0116566 A1 | 5/2010 | Ohm |
| 2010/0125968 A1 | 5/2010 | Ho |
| 2010/0139029 A1 | 6/2010 | Kim |
| 2010/0139995 A1 | 6/2010 | Rudakevych |
| 2010/0161225 A1 | 6/2010 | Hyung |
| 2010/0173070 A1 | 7/2010 | Niu |
| 2010/0206336 A1 | 8/2010 | Souid |
| 2010/0217436 A1 | 8/2010 | Jones |
| 2010/0256812 A1 | 10/2010 | Tsusaka |
| 2010/0257690 A1 | 10/2010 | Jones |
| 2010/0257691 A1 | 10/2010 | Jones |
| 2010/0263142 A1 | 10/2010 | Jones |
| 2010/0263158 A1 | 10/2010 | Jones |
| 2010/0268384 A1 | 10/2010 | Jones |
| 2010/0275405 A1 | 11/2010 | Morse |
| 2010/0286791 A1 | 11/2010 | Goldsmith |
| 2010/0305752 A1 | 12/2010 | Abramson |
| 2010/0312429 A1 | 12/2010 | Jones |
| 2010/0313910 A1 | 12/2010 | Lee |
| 2010/0313912 A1 | 12/2010 | Han |
| 2011/0000363 A1 | 1/2011 | More |
| 2011/0004339 A1 | 1/2011 | Ozick |
| 2011/0010873 A1 | 1/2011 | Kim |
| 2011/0077802 A1 | 3/2011 | Halloran |
| 2011/0082668 A1 | 4/2011 | Escrig |
| 2011/0088609 A1 | 4/2011 | Vosburgh |
| 2011/0109549 A1 | 5/2011 | Robbins |
| 2011/0125323 A1 | 5/2011 | Gutmann |
| 2011/0125324 A1 | 5/2011 | Baek et al. |
| 2011/0131741 A1 | 6/2011 | Jones |
| 2011/0154589 A1 | 6/2011 | Reindle |
| 2011/0202175 A1 | 8/2011 | Romanov |
| 2011/0209726 A1 | 9/2011 | Dayton |
| 2011/0252594 A1 | 10/2011 | Blouin |
| 2011/0258789 A1 | 10/2011 | Lavabre |
| 2011/0271469 A1 | 11/2011 | Ziegler |
| 2011/0277269 A1 | 11/2011 | Kim |
| 2011/0286886 A1 | 11/2011 | Luchinger |
| 2011/0288684 A1 | 11/2011 | Farlow |
| 2012/0011668 A1 | 1/2012 | Schnittman |
| 2012/0011669 A1 | 1/2012 | Schnittman |
| 2012/0011676 A1 | 1/2012 | Jung |
| 2012/0011677 A1 | 1/2012 | Jung |
| 2012/0011992 A1 | 1/2012 | Rudakevych |
| 2012/0036659 A1 | 2/2012 | Ziegler |
| 2012/0047676 A1 | 3/2012 | Jung |
| 2012/0049798 A1 | 3/2012 | Cohen |
| 2012/0079670 A1 | 4/2012 | Yoon |
| 2012/0083924 A1 | 4/2012 | Jones |
| 2012/0084934 A1 | 4/2012 | Li |
| 2012/0084937 A1 | 4/2012 | Won |
| 2012/0084938 A1 | 4/2012 | Fu |
| 2012/0085368 A1 | 4/2012 | Landry |
| 2012/0090133 A1 | 4/2012 | Kim |
| 2012/0095619 A1 | 4/2012 | Pack |
| 2012/0096656 A1 | 4/2012 | Jung |
| 2012/0097783 A1 | 4/2012 | Pack |
| 2012/0101661 A1 | 4/2012 | Phillips |
| 2012/0102670 A1 | 5/2012 | Jang |
| 2012/0106829 A1 | 5/2012 | Lee |
| 2012/0109376 A1 | 5/2012 | Lee et al. |
| 2012/0109423 A1 | 5/2012 | Pack |
| 2012/0110755 A1 | 5/2012 | Liu |
| 2012/0118216 A1 | 5/2012 | Vosburgh |
| 2012/0125363 A1 | 5/2012 | Kim |
| 2012/0137464 A1 | 6/2012 | Thatcher |
| 2012/0137949 A1 | 6/2012 | Vosburgh |
| 2012/0151709 A1 | 6/2012 | Tang |
| 2012/0152280 A1 | 6/2012 | Bosses |
| 2012/0152877 A1 | 6/2012 | Tadayon |
| 2012/0159725 A1 | 6/2012 | Kapoor |
| 2012/0166024 A1 | 6/2012 | Phillips |
| 2012/0167917 A1 | 7/2012 | Gilbert |
| 2012/0169497 A1 | 7/2012 | Schnittman |
| 2012/0173018 A1 | 7/2012 | Allen |
| 2012/0173070 A1 | 7/2012 | Schnittman |
| 2012/0180254 A1 | 7/2012 | Morse |
| 2012/0180712 A1 | 7/2012 | Vosburgh |
| 2012/0181099 A1 | 7/2012 | Moon |
| 2012/0182392 A1 | 7/2012 | Kearns |
| 2012/0183382 A1 | 7/2012 | Couture |
| 2012/0185091 A1 | 7/2012 | Field |
| 2012/0185094 A1 | 7/2012 | Rosenstein |
| 2012/0185095 A1 | 7/2012 | Rosenstein |
| 2012/0185096 A1 | 7/2012 | Rosenstein |

(56) References Cited

U.S. PATENT DOCUMENTS

| | | |
|---|---|---|
| 2012/0192898 A1 | 8/2012 | Lynch |
| 2012/0194395 A1 | 8/2012 | Williams |
| 2012/0194427 A1 | 8/2012 | Lee |
| 2012/0197439 A1 | 8/2012 | Wang |
| 2012/0197464 A1 | 8/2012 | Wang |
| 2012/0199006 A1 | 8/2012 | Swett |
| 2012/0199407 A1 | 8/2012 | Morey |
| 2012/0200149 A1 | 8/2012 | Rudakevych |
| 2012/0222224 A1 | 9/2012 | Yoon |
| 2012/0246862 A1 | 10/2012 | Landry |
| 2012/0260443 A1 | 10/2012 | Lindgren |
| 2012/0260861 A1 | 10/2012 | Lindgren |
| 2012/0261204 A1 | 10/2012 | Won |
| 2012/0265346 A1 | 10/2012 | Gilbert |
| 2012/0265391 A1 | 10/2012 | Letsky |
| 2012/0268587 A1 | 10/2012 | Robbins |
| 2012/0281829 A1 | 11/2012 | Rudakevych |
| 2012/0298029 A1 | 11/2012 | Vosburgh |
| 2012/0303160 A1 | 11/2012 | Ziegler |
| 2012/0311810 A1 | 12/2012 | Gilbert |
| 2012/0312221 A1 | 12/2012 | Vosburgh |
| 2012/0317745 A1 | 12/2012 | Jung |
| 2012/0322349 A1 | 12/2012 | Josi |
| 2013/0006418 A1* | 1/2013 | Tian ................ H02J 7/00036 700/245 |
| 2013/0015596 A1 | 1/2013 | Mozeika |
| 2013/0025085 A1 | 1/2013 | Kim |
| 2013/0031734 A1 | 2/2013 | Porat |
| 2013/0032078 A1 | 2/2013 | Yahnker |
| 2013/0035793 A1 | 2/2013 | Neumann |
| 2013/0047368 A1 | 2/2013 | Tran |
| 2013/0054029 A1 | 2/2013 | Huang |
| 2013/0054129 A1 | 2/2013 | Wong |
| 2013/0060357 A1 | 3/2013 | Li |
| 2013/0060379 A1 | 3/2013 | Choe |
| 2013/0070563 A1 | 3/2013 | Chiappetta |
| 2013/0081218 A1 | 4/2013 | Kim |
| 2013/0085603 A1 | 4/2013 | Chiappetta |
| 2013/0086760 A1 | 4/2013 | Han |
| 2013/0092190 A1 | 4/2013 | Yoon |
| 2013/0098402 A1 | 4/2013 | Yoon |
| 2013/0103194 A1 | 4/2013 | Jones |
| 2013/0105233 A1 | 5/2013 | Couture |
| 2013/0116825 A1 | 5/2013 | Kim et al. |
| 2013/0117952 A1 | 5/2013 | Schnittman |
| 2013/0118524 A1 | 5/2013 | Konandreas |
| 2013/0138246 A1 | 5/2013 | Gutmann |
| 2013/0138337 A1 | 5/2013 | Pack |
| 2013/0145572 A1 | 6/2013 | Schregardus |
| 2013/0152724 A1 | 6/2013 | Mozeika |
| 2013/0152970 A1 | 6/2013 | Porat |
| 2013/0160226 A1 | 6/2013 | Lee |
| 2013/0166107 A1 | 6/2013 | Robbins |
| 2013/0174371 A1 | 7/2013 | Jones |
| 2013/0198481 A1 | 8/2013 | Gander |
| 2013/0200993 A1 | 8/2013 | Wu |
| 2013/0204463 A1 | 8/2013 | Chiappetta |
| 2013/0204465 A1 | 8/2013 | Phillips |
| 2013/0204483 A1 | 8/2013 | Sung |
| 2013/0205520 A1 | 8/2013 | Kapoor |
| 2013/0206170 A1 | 8/2013 | Svendsen |
| 2013/0206177 A1 | 8/2013 | Burlutskiy |
| 2013/0211589 A1 | 8/2013 | Landry |
| 2013/0214498 A1 | 8/2013 | DeFazio |
| 2013/0226344 A1 | 8/2013 | Wong |
| 2013/0227801 A1 | 9/2013 | Kim |
| 2013/0227812 A1 | 9/2013 | Kim |
| 2013/0228198 A1 | 9/2013 | Hung |
| 2013/0228199 A1 | 9/2013 | Hung |
| 2013/0231779 A1 | 9/2013 | Purkayastha |
| 2013/0231819 A1 | 9/2013 | Hung |
| 2013/0232702 A1 | 9/2013 | Baek |
| 2013/0239870 A1 | 9/2013 | Hudson |
| 2013/0241217 A1 | 9/2013 | Hickey |
| 2013/0253701 A1 | 9/2013 | Halloran |
| 2013/0256042 A1 | 10/2013 | Rudakevych |
| 2013/0268118 A1 | 10/2013 | Grinstead |
| 2013/0269148 A1 | 10/2013 | Chiu |
| 2013/0273252 A1 | 10/2013 | Miyamoto |
| 2013/0298350 A1 | 11/2013 | Schnittman |
| 2013/0310978 A1 | 11/2013 | Ozick |
| 2013/0317944 A1 | 11/2013 | Huang |
| 2013/0325178 A1 | 12/2013 | Jones |
| 2013/0331987 A1 | 12/2013 | Karlsson |
| 2013/0338525 A1 | 12/2013 | Allen |
| 2013/0338828 A1 | 12/2013 | Chiappetta |
| 2013/0338831 A1 | 12/2013 | Noh |
| 2013/0340201 A1 | 12/2013 | Jang |
| 2014/0016469 A1 | 1/2014 | Ho |
| 2014/0026338 A1 | 1/2014 | Kim |
| 2014/0026339 A1 | 1/2014 | Konandreas |
| 2014/0053351 A1 | 2/2014 | Kapoor |
| 2014/0100736 A1 | 4/2014 | Kim et al. |
| 2014/0109339 A1 | 4/2014 | Won |
| 2014/0123325 A1 | 5/2014 | Jung |
| 2014/0130272 A1 | 5/2014 | Won |
| 2014/0142757 A1 | 5/2014 | Ziegler |
| 2014/0166047 A1 | 6/2014 | Hillen |
| 2014/0167931 A1 | 6/2014 | Lee |
| 2014/0180968 A1 | 6/2014 | Song |
| 2014/0184144 A1 | 7/2014 | Henricksen |
| 2014/0207280 A1 | 7/2014 | Duffley |
| 2014/0207281 A1 | 7/2014 | Angle |
| 2014/0207282 A1 | 7/2014 | Angle |
| 2014/0238440 A1 | 8/2014 | Dayton |
| 2014/0249671 A1 | 9/2014 | Halloran |
| 2014/0283326 A1 | 9/2014 | Song |
| 2014/0343783 A1 | 11/2014 | Lee |
| 2015/0000068 A1 | 1/2015 | Tsuboi |
| 2015/0005937 A1 | 1/2015 | Ponulak |
| 2015/0032259 A1 | 1/2015 | Kim |
| 2015/0033488 A1 | 2/2015 | Varila |
| 2015/0039127 A1 | 2/2015 | Matsumoto |
| 2015/0057800 A1 | 2/2015 | Cohen |
| 2015/0120056 A1 | 4/2015 | Noh |
| 2015/0127150 A1 | 5/2015 | Ponulak et al. |
| 2015/0157182 A1* | 6/2015 | Noh ................ A47L 11/4011 701/28 |
| 2015/0168541 A1 | 6/2015 | Lee et al. |
| 2015/0185322 A1 | 7/2015 | Haegermarck |
| 2015/0197012 A1 | 7/2015 | Schnittman |
| 2015/0206015 A1 | 7/2015 | Ramalingam |
| 2015/0265122 A1 | 9/2015 | Han |
| 2016/0007817 A1 | 1/2016 | Schlischka |
| 2016/0008982 A1 | 1/2016 | Artes |
| 2016/0202703 A1 | 7/2016 | Matsubara |
| 2016/0298970 A1 | 10/2016 | Lindhe |
| 2016/0306359 A1 | 10/2016 | Lindhe |
| 2016/0316982 A1 | 11/2016 | Kim |
| 2017/0102709 A1 | 4/2017 | Kwak et al. |
| 2017/0164802 A1 | 6/2017 | Cudzilo |
| 2017/0201617 A1 | 7/2017 | So et al. |
| 2017/0203446 A1 | 7/2017 | Dooleyt |
| 2017/0265703 A1* | 9/2017 | Park ................ A47L 9/2873 |
| 2017/0273521 A1 | 9/2017 | Klintemyr |
| 2017/0273524 A1 | 9/2017 | Klintemyr |
| 2017/0296021 A1 | 10/2017 | Li |
| 2017/0303761 A1* | 10/2017 | Chang ................ A47L 11/4002 |
| 2017/0344013 A1 | 11/2017 | Haegermarck |
| 2018/0103812 A1 | 4/2018 | Lee |
| 2018/0199784 A1 | 7/2018 | Schnittman et al. |
| 2018/0281179 A1* | 10/2018 | Michalakis ............ B25J 9/1666 |
| 2018/0344116 A1 | 12/2018 | Schriesheim et al. |
| 2019/0072975 A1 | 3/2019 | Choi |
| 2019/0094869 A1* | 3/2019 | Artes ................ G05D 1/0219 |
| 2019/0133400 A1 | 5/2019 | Klintemyr et al. |

FOREIGN PATENT DOCUMENTS

| | | |
|---|---|---|
| CN | 1668238 | 9/2005 |
| CN | 1883889 | 12/2006 |
| CN | 101161174 | 4/2008 |
| CN | 100388142 | 5/2008 |
| CN | 101297267 | 10/2008 |

(56) References Cited

FOREIGN PATENT DOCUMENTS

| | | |
|---|---|---|
| CN | 101563014 | 10/2009 |
| CN | 102046059 | 5/2011 |
| CN | 102083352 | 6/2011 |
| CN | 102183959 | 9/2011 |
| CN | 102506748 | 6/2012 |
| CN | 102949144 | 3/2013 |
| CN | 103027634 | 4/2013 |
| CN | 103054516 | 4/2013 |
| CN | 103308050 | 9/2013 |
| CN | 103376801 | 10/2013 |
| CN | 103491838 | 1/2014 |
| CN | 103534659 | 1/2014 |
| CN | 103565373 | 2/2014 |
| CN | 103948354 | 7/2014 |
| CN | 103976694 | 8/2014 |
| CN | 203841627 | 9/2014 |
| CN | 104161487 A | 11/2014 |
| CN | 104769962 A | 7/2015 |
| CN | 105326442 | 2/2016 |
| CN | 105982611 | 10/2016 |
| CN | 106037591 A | 10/2016 |
| CN | 106796418 A | 5/2017 |
| CN | 107137022 A | 9/2017 |
| DE | 3536907 | 4/1986 |
| DE | 9307500 | 7/1993 |
| DE | 4211789 | 10/1993 |
| DE | 4340367 | 6/1995 |
| DE | 4439427 | 5/1996 |
| DE | 19849978 | 5/2000 |
| DE | 10311299 | 4/2004 |
| DE | 202008017137 | 3/2009 |
| DE | 102010000174 | 7/2011 |
| DE | 102010000573 | 9/2011 |
| DE | 102010037672 | 3/2012 |
| DE | 202017000833 | 3/2017 |
| EP | 0142594 | 5/1985 |
| EP | 0358628 | 3/1990 |
| EP | 0474542 | 3/1992 |
| EP | 0569984 | 11/1993 |
| EP | 0606173 | 7/1994 |
| EP | 1099143 | 11/2003 |
| EP | 1360922 | 11/2003 |
| EP | 1441271 | 7/2004 |
| EP | 1331537 | 8/2005 |
| EP | 2050380 | 4/2009 |
| EP | 1969438 | 9/2009 |
| EP | 2296005 | 3/2011 |
| EP | 1395888 | 5/2011 |
| EP | 2316322 | 5/2011 |
| EP | 2322071 | 5/2011 |
| EP | 2251757 | 11/2011 |
| EP | 2417894 | 2/2012 |
| EP | 2438843 | 4/2012 |
| EP | 2447800 | 5/2012 |
| EP | 2466411 | 6/2012 |
| EP | 2502540 | 9/2012 |
| EP | 2561787 | 2/2013 |
| EP | 2578125 | 4/2013 |
| EP | 2583608 | 4/2013 |
| EP | 2583609 | 4/2013 |
| EP | 2604163 | 6/2013 |
| EP | 2624177 | 8/2013 |
| EP | 2725443 | 4/2014 |
| EP | 2741483 | 6/2014 |
| EP | 2772815 | 9/2014 |
| EP | 2980670 | 2/2016 |
| EP | 2992803 | 3/2016 |
| EP | 3047782 | 7/2016 |
| EP | 3135173 | 3/2017 |
| EP | 3199083 | 8/2017 |
| FR | 2999410 | 6/2014 |
| GB | 1447943 | 9/1976 |
| GB | 2355523 | 4/2001 |
| GB | 2382251 | 5/2003 |
| GB | 2494446 | 3/2013 |
| GB | 2884364 | 6/2015 |
| JP | 5540959 | 3/1980 |
| JP | 6286414 | 4/1987 |
| JP | 62109528 | 5/1987 |
| JP | 62120510 | 6/1987 |
| JP | 62152421 | 7/1987 |
| JP | 62152424 | 7/1987 |
| JP | 63127310 | 5/1988 |
| JP | 63181727 | 7/1988 |
| JP | 63241610 | 10/1988 |
| JP | 03162814 | 7/1991 |
| JP | 03166074 | 7/1991 |
| JP | 04260905 | 9/1992 |
| JP | 0584200 | 4/1993 |
| JP | 0584210 | 4/1993 |
| JP | 05084200 | 4/1993 |
| JP | 05189041 | 7/1993 |
| JP | 05224745 | 9/1993 |
| JP | 05228090 | 9/1993 |
| JP | 064133 | 1/1994 |
| JP | 0683442 | 3/1994 |
| JP | 06125861 | 5/1994 |
| JP | 06144215 | 5/1994 |
| JP | 06179145 | 6/1994 |
| JP | 075922 | 1/1995 |
| JP | 0759695 | 3/1995 |
| JP | 0732752 | 4/1995 |
| JP | 07129239 | 5/1995 |
| JP | 07281742 | 10/1995 |
| JP | 07287617 | 10/1995 |
| JP | 08089455 | 4/1996 |
| JP | 08326025 | 12/1996 |
| JP | 0944240 | 2/1997 |
| JP | 09150741 | 6/1997 |
| JP | 09160644 A | 6/1997 |
| JP | 09185410 | 7/1997 |
| JP | 11267074 | 10/1999 |
| JP | 2001022443 | 1/2001 |
| JP | 2001187009 | 7/2001 |
| JP | 2002085305 A | 3/2002 |
| JP | 2002287824 | 10/2002 |
| JP | 2002533797 | 10/2002 |
| JP | 2002355204 | 12/2002 |
| JP | 2002366228 | 12/2002 |
| JP | 2003505127 | 2/2003 |
| JP | 2003116758 | 4/2003 |
| JP | 2003180587 | 7/2003 |
| JP | 2003225184 | 8/2003 |
| JP | 2003280740 | 10/2003 |
| JP | 2004096253 | 3/2004 |
| JP | 2004136144 | 5/2004 |
| JP | 2004148089 A | 5/2004 |
| JP | 2004166968 | 6/2004 |
| JP | 2004198212 | 7/2004 |
| JP | 2004303134 | 10/2004 |
| JP | 200540597 | 2/2005 |
| JP | 2005050105 | 2/2005 |
| JP | 2005124753 | 5/2005 |
| JP | 2005141636 | 6/2005 |
| JP | 2005192609 | 7/2005 |
| JP | 2005304553 A | 11/2005 |
| JP | 2005314116 | 11/2005 |
| JP | 2006015113 | 1/2006 |
| JP | 2006087507 | 4/2006 |
| JP | 2006231477 | 9/2006 |
| JP | 2006277121 A | 10/2006 |
| JP | 2006314669 | 11/2006 |
| JP | 2007014369 | 1/2007 |
| JP | 2007070658 | 3/2007 |
| JP | 2007143645 | 6/2007 |
| JP | 2006185438 | 7/2007 |
| JP | 2007213236 | 8/2007 |
| JP | 2007226322 | 9/2007 |
| JP | 2007272665 | 10/2007 |
| JP | 2008132299 | 6/2008 |
| JP | 2008146617 | 6/2008 |
| JP | 2008290184 | 12/2008 |
| JP | 2008543394 | 12/2008 |
| JP | 2009500741 | 1/2009 |

(56) References Cited

FOREIGN PATENT DOCUMENTS

| | | |
|---|---|---|
| JP | 2009509220 | 3/2009 |
| JP | 2009193240 | 8/2009 |
| JP | 2010507169 | 3/2010 |
| JP | 201079869 | 4/2010 |
| JP | 2010526594 | 8/2010 |
| JP | 2010534825 | 11/2010 |
| JP | 2011045694 | 3/2011 |
| JP | 2011253361 | 12/2011 |
| JP | 2012216051 | 11/2012 |
| JP | 2013041506 | 2/2013 |
| JP | 2013059625 | 4/2013 |
| JP | 201389256 | 5/2013 |
| JP | 2013089256 | 5/2013 |
| JP | 2013149250 A | 8/2013 |
| JP | 2013247986 | 12/2013 |
| JP | 2014023930 | 2/2014 |
| JP | 2014193383 | 10/2014 |
| JP | 2015009109 A | 1/2015 |
| JP | 2015534048 | 11/2015 |
| KR | 950002044 | 3/1995 |
| KR | 20040096253 | 11/2004 |
| KR | 20050003112 | 1/2005 |
| KR | 100544479 | 1/2006 |
| KR | 20070070658 | 7/2007 |
| KR | 1020080076169 A | 8/2008 |
| KR | 20090028359 | 3/2009 |
| KR | 20090076738 | 7/2009 |
| KR | 20120047137 | 5/2012 |
| KR | 101231932 | 3/2013 |
| KR | 20150124011 | 11/2015 |
| KR | 20160021991 A | 2/2016 |
| KR | 20170087403 A | 7/2017 |
| NL | 7408667 | 1/1975 |
| WO | 8804081 | 6/1988 |
| WO | 9303399 | 2/1993 |
| WO | 9638770 | 12/1996 |
| WO | 0036961 | 6/2000 |
| WO | 0036970 | 6/2000 |
| WO | 0038025 | 6/2000 |
| WO | 0182766 | 11/2001 |
| WO | 03022120 | 3/2003 |
| WO | 03024292 | 3/2003 |
| WO | 2003026474 | 4/2003 |
| WO | 2004006034 | 1/2004 |
| WO | 2004082899 | 9/2004 |
| WO | 2007008148 | 1/2007 |
| WO | 2007028049 | 3/2007 |
| WO | 2007051972 | 5/2007 |
| WO | 2007065034 | 6/2007 |
| WO | 2008048260 | 4/2008 |
| WO | 2009132317 | 10/2009 |
| WO | 2011003667 | 1/2011 |
| WO | 2012008702 | 1/2012 |
| WO | 2012157951 A2 | 11/2012 |
| WO | 2013105431 | 7/2013 |
| WO | 2013157324 | 10/2013 |
| WO | 2013162094 | 10/2013 |
| WO | 2014033055 | 3/2014 |
| WO | 2014113091 A1 | 7/2014 |
| WO | 2014151501 | 9/2014 |
| WO | 2015016580 | 2/2015 |
| WO | 2015090402 | 6/2015 |
| WO | 2016005011 | 1/2016 |
| WO | 2017140726 A1 | 8/2017 |

OTHER PUBLICATIONS

USPTO Non Final Office Action issued in U.S. Appl. No. 16/333,336, dated Nov. 18, 2020, 27 pages.
Japanese Notice of Reasons for Refusal issued in Japanese Patent Application No. 2020-512880, dated Jul. 8, 2021 1 with translation, 6 pages.
Chinese Office Action for Chinese Application No. 2017800942211, dated Mar. 3, 2021, 10 pages.
USPTO Final Office Action issued in U.S. Appl. No. 16/333,336, dated Mar. 16, 2021, 24 pages.
Japanese Notice of Reasons for Refusal for Japanese Application No. 2020-512880, dated Feb. 25, 2021 with translation, 9 pages.
"SM51 Series Opposed Mode Sensors, DC sensors with metal housings: SM51EB/RB, SM51EB6/RB6", Banner Engineering Corporation, pp. 1-24.
Andersson, et al., "ISR: An Intelligent Service Robot", Centre for Autonomous Systems, Royal Institute of Technology, S-100 44 Stockholm, Sweden, pp. 1-24.
Berlin, et al. "Development of a Multipurpose Mobile Robot for Concrete Surface Processing", A Status Report, Feb. 1992, Sweden, pp. 1-10.
Borenstein, et al. "Real-Time Obstacle Avoidance for Fast Mobile Robots", IEEE, Jan. 6, 1996, pp. 1-18.
Braunstingl, et al., "Fuzzy Logic Wall Following of a Mobile Robot Based on the Concept of General Perception", ICAR '95, 7th International Conference on Advanced Robotics, Sant Feliu De Guixols, Spain pp. 367-376., Sep. 1995, pp. 1-9.
Caselli, et al. "Mobile Robot Navigation in Enclosed Large-Scale Space", Italy and U.S.A., pp. 1-5.
Cassens, et al. "Finishing and Maintaining Wood Floors", Wood Finishing, North Central Regional Extension Publication #136, pp. 1-8.
Chinese Office Action for Chinese Application No. 2014800837122, dated May 5, 2019 with translation, 20 pages.
Chinese Office Action for Application No. 201380081331.6, dated Mar. 26, 2018 with translation, 27 pages.
Chinese Office Action for Application No. 2014800837122, dated Jul. 17, 2020 with translation, 18 pages.
Chinese Office Action for Chinese Applciation No. 201380081537.9, dated Jun. 4, 2018 with translation, 15 pages.
Chinese Office Action for Chinese Application No. 20130075510.9, dated Feb. 6, 2017 with translation, 14 pages.
Chinese Office Action for Chinese Application No. 201380075503.9, dated Feb. 13, 2017 with translation, 18 pages.
Chinese Office Action for Chinese Application No. 201380075503.9, dated Nov. 8, 2017 with translation, 16 pages.
Chinese Office Action for Chinese Application No. 201380075510.9, dated Oct. 27, 2017 with translation, 13 pages.
Chinese Office Action for Chinese Application No. 201380081103.9, dated Feb. 27, 2018 with translation, 19 pages.
Chinese Office Action for Chinese Application No. 201380081103.9, dated Jun. 6, 2019 with translation, 10 pages.
Chinese Office Action for Chinese Application No. 201380081535.X, dated Jun. 12, 2019, 25 pages.
Chinese Office Action for Chinese Application No. 201380081535.X, dated Mar. 26, 2018, 18 pages.
Chinese Office Action for Chinese Application No. 201380081537.9, dated Jan. 30, 2019 with translation, 12 pages.
Chinese Office Action for Chinese Application No. 201480079515.3, dated Jun. 5, 2019, 9 pages.
Chinese Office Action for Chinese Application No. 201480083392.0, dated Jan. 3, 2020, 8 pages.
Chinese Office Action for Chinese Application No. 2014800837122, dated Jan. 7, 2020, 10 pages.
Chinese Office Action for Chinese Application No. 201480084065.7, dated Sep. 16, 2019 with translation, 16 pages.
Chinese Office Action for Chinese Application No. 2015800781846, dated Mar. 24, 2020, 9 pages.
Chinese Office Action for Chinese Application No. 2015800781846, dated Sep. 18, 2019 with translation, 15 pages.
Chinese Office Action for Chinese Application No. 201580082852.2, dated Mar. 3, 2020, 8 pages.
Chung et al., "Path Planning For A Mobile Robot With Grid Type World Model, Proceedings of the 1992 IEEE/RSJ International Conference on Intelligent Robots and Systems", Jul. 7-10, 1992, pp. 439-444.
Collins, et al. "Cerebellar Control of a Line Following Robot", Computer Science and Electrical Engineering Department, University of Queensland, St.Lucia, Queensland, 4072 A, pp. 1-6.
Decision for Refusal for Japanese Application No. 2016-526875, dated May 15, 2018 with translation, 6 pages.

(56) References Cited

OTHER PUBLICATIONS

Decision of Refusal for Japanese Application No. 2016-526945, dated May 7, 2017 with translation, 5 pages.
Doty, et al. "Sweep Strategies for a Sensory-Driven, Behavior-Based Vacuum Cleaning Agent", 1993, Machine Intelligence Laboratory—Gainesville Florida, AAAI 1993 Fall Symposium Series—Research Triangle Park—Raleigh, NC, Oct. 22-24, 1993, pp. 1-6.
European Communication Pursuant to Article 94(3) for European Application No. 16176479.0, dated Nov. 27, 2017, 6 pages.
European Communication Pursuant to Article 94(3) for European Application No. 18157403.9, dated Jun. 9, 2020, 5 pages.
European Communication Pursuant to Article 94(3) for European Application No. 15759442.5, dated Apr. 17, 2019, 6 pages.
Everett, Sensors For Mobile Robots Theory and Application, A.K. Peters, 1995, Chapters 1 and 3, 70 pages.
Everett, Sensors For Mobile Robots Theory and Application, A.K. Peters, Ltd., 1995, Chapters 15 and 16, 59 pages.
Everett, Sensors for Mobile Robots Theory and Application, A.K. Peters, Ltd., 1995, Chapters 6, 7 and 10, 79 pages.
Everett, Sensors For Mobile Robots Theory and Application, A.K. Peters, Ltd., 1995, Chapters, 4 and 5, 68 pages.
Everett, et al. "Survey of Collision Avoidance and Ranging Sensors for Mobile Robots", Revision 1, Technical Report 1194, Dec. 1992, pp. 1-154.
Extended European Search Report for European Application No. 16176479.0, dated Nov. 11, 2016, 9 pages.
Extended European Search Report for European Application No. 18157403.9, dated Nov. 14, 2018, 12 pages.
Final Office Action for U.S. Appl. No. 14/409,291, dated Jun. 6, 2017, 21 pages.
Final Office Action for U.S. Appl. No. 14/784,106, dated Mar. 28, 2018, 8 pages.
Final Office Action for U.S. Appl. No. 15/100,667, dated Apr. 21, 2017, 26 pages.
Final Office Action for U.S. Appl. No. 15/100,667, dated Mar. 27, 2018, 23 pages.
Final Office Action for U.S. Appl. No. 15/101,212, dated Oct. 11, 2017, 7 pages.
Final Office Action for U.S. Appl. No. 15/101,510, dated Feb. 8, 2019, 16 pages.
Final Office Action for U.S. Appl. No. 15/321,333, dated Apr. 18, 2019, 14 pages.
Final Office Action for U.S. Appl. No. 15/504,066, dated Mar. 21, 2019, 18 pages.
Final Office Action for U.S. Appl. No. 15/504,071, dated Dec. 4, 2019, 20 pages.
Final Office Action for U.S. Appl. No. 15/504,071, dated Mar. 5, 2019, 20 pages.
Final Office Action for U.S. Appl. No. 15/534,327, dated Jul. 26, 2019, 16 pages.
Final Office Action for U.S. Appl. No. 15/534,591, dated Dec. 2, 2019, 12 pages.
Final Office Action for U.S. Appl. No. 15/535,506, dated Sep. 17, 2019, 11 pages.
Final Office Action for U.S. Appl. No. 15/565,467, dated Jun. 2, 2020, 8 pages.
Final Office Action for U.S. Appl. No. 15/101,235, dated Jan. 11, 2019, 12 pages.
Gavrilut, et al., "Wall-Following Method for an Autonomous Mobile Robot using Two IR Sensors", 12th WSEAS International Conference on Systems, Heraklion, Greece, Jul. 22-24, 2008, ISBN: 978-960-6766-83-1, ISSN: 1790-2769, pp. 205-209.
Gutman et al., AMOS: Comparison of Scan Matching Approaches for Self-Localization in Indoor Environments, 1996, IEEE, pp. 61-67.
Herbst, et al., "Micromouse Design Specifications", Jun. 2, 1998, pp. 1-22.
International Preliminary Report on Patentability for International Application No. PCT/EP2013/077377, dated Jun. 21, 2016, 12 pages.
International Preliminary Report on Patentability for International Application No. PCT/EP2013/077378, dated Jun. 21, 2016, 7 pages.
International Preliminary Report on Patentability for International Application No. PCT/EP2013/077384, dated Jun. 21, 2016, 6 pages.
International Preliminary Report on Patentability for International Application No. PCT/EP2013/077385, dated Jun. 21, 2016, 7 pages.
International Preliminary Report on Patentability for International Application No. PCT/EP2013/077386, dated Jun. 21, 2016, 6 pages.
International Preliminary Report on Patentability for International Application No. PCT/EP2013/077387, dated Jun. 21, 2016, 9 pages.
International Preliminary Report on Patentability for International Application No. PCT/EP2013/077657, dated Jun. 21, 2016, 7 pages.
International Preliminary Report on Patentability for International Application No. PCT/EP2013/077661, dated Jun. 21, 2016, 11 pages.
International Preliminary Report on Patentability for International Application No. PCT/EP2017/056100, dated Sep. 17, 2019, 6 pages.
International Preliminary Report on Patentability for International Application No. PCT/EP2013/077380, dated Jun. 21, 2016, 6 pages.
International Search Report and Written Opinion of the International Searching Authority for International Application No. PCT/EP2016/055547, dated Jan. 2, 2017, 10 pages.
International Search Report and Written Opinion for International Application No. PCT/EP2017/056100, dated Dec. 18, 2017, 9 pages.
International Search Report and Written Opinion for International Application No. PCT/EP2017/063468, dated Mar. 1, 2018, 10 pages.
International Search Report and Written Opinion for International Application No. PCT/EP2017/072267, dated Jun. 6, 2018, 9 pages.
International Search Report and Written Opinion for International Application No. PCT/EP2017/074406, dated May 2, 2018, 9 pages.
International Search Report and Written Opinion for International Application No. PCT/EP2017/077493, dated Jun. 28, 2018, 11 pages.
International Search Report and Written Opinion of the International Searching Authority for International Application No. PCT/EP2015/070140, dated May 27, 2016, 11 pages.
International Search Report and Written Opinion of the International Searching Authority for International Application No. PCT/EP2015/058377, dated Aug. 10, 2016, 15 pages.
International Search Report and Written Opinion of the International Searching Authority for International Application No. PCT/EP2014/069073, dated May 12, 2015, 10 pages.
International Search Report and Written Opinion of the International Searching Authority for International Application No. PCT/EP2012/077377, dated Nov. 6, 2014, 18 pages.
International Search Report and Written Opinion of the International Searching Authority for International Application No. PCT/EP2013/077378, dated Apr. 9, 2014, 9 pages.
International Search Report and Written Opinion of the International Searching Authority for International Application No. PCT/EP2013/077380, dated Jul. 28, 2014, 8 pages.
International Search Report and Written Opinion of the International Searching Authority for International Application No. PCT/EP2013/077384, dated Aug. 14, 2014, 9 pages.
International Search Report and Written Opinion of the International Searching Authority for International Application No. PCT/EP2013/077385, dated May 27, 2045, 9 pages.
International Search Report and Written Opinion of the International Searching Authority for International Application No. PCT/EP2013/077386, dated Sep. 17, 2014, 9 pages.
International Search Report and Written Opinion of the International Searching Authority for International Application No. PCT/EP2013/077387, dated Sep. 30, 2014, 12 pages.
International Search Report and Written Opinion of the International Searching Authority for International Application No. PCT/EP2013/077661, dated Jun. 10, 2014, 15 pages.
International Search Report and Written Opinion of the International Searching Authority for International Application No. PCT/EP2014/069074, dated May 11, 2015, 9 pages.

(56) References Cited

OTHER PUBLICATIONS

International Search Report and Written Opinion of the International Searching Authority for International Application No. PCT/EP2014/077549, dated Jul. 27, 2015, 9 pages.
International Search Report and Written Opinion of the International Searching Authority for International Application No. PCT/EP2014/077947, dated Jul. 11, 2016, 14 pages.
International Search Report and Written Opinion of the International Searching Authority for International Application No. PCT/EP2014/077954, dated Oct. 12, 2015, 11 pages.
International Search Report and Written Opinion of the International Searching Authority for International Application No. PCT/EP2014/078144, dated Apr. 15, 2015, 8 pages.
International Search Report and Written Opinion of the International Searching Authority for International Application No. PCT/EP2016/060565, dated Feb. 15, 2017, 12 pages.
International Search Report and Written Opinion of the International Searching Authority for International Application No. PCT/EP2016/060571, dated Feb. 7, 2017, 8 pages.
International Search Report and Written Opinion of the International Searching Authority for International Application No. PCT/EP2016/072291, dated Jun. 6, 2017, 11 pages.
International Search Report and Written Opinion of the International Searching Authority for International Application No. PCT/EP/2013/077657, dated Aug. 18, 2014, 10 pages.
International Search Report and Written Opinion of the International Searching Authority for Internatonal Application No. PCT/EP2014/0077142, dated Sep. 11, 2015, 8 pages.
International Search Report for International Application No. PCT/EP2013/057814 dated Dec. 20, 2013, 5 pages.
International Search Report for International Application No. PCT/EP2013/057815 dated Apr. 2, 2014, 4 pages.
International Search Report for International Application No. PCT/EP2013/067500 dated Dec. 10, 2013, 4 pages.
Japanese Notice of Reasons for Refusal for Japanese Application No. 2019-2718, dated Nov. 28, 2019 with translation, 4 pages.
Japanese Notice of Reasons for Refusal for Japanese Application No. 2017-522557, dated Jun. 18, 2019 with translation, 6 pages.
Japanese Notice of Reasons for Refusal for Japanese Application No. 2018-537617, dated Feb. 28, 2020, 3 pages.
Japanese Office Action for Application for Japanese Application No. 2015-528969, dated Apr. 7, 2017 with translation, 4 pages.
Japanese Office Action for Japanese Application No. 2016-506794, dated Feb. 7, 2017 with translation, 10 pages.
Japanese Office Action for Japanese Application No. 2016-506795, dated Feb. 7, 2017 with translation, 6 pages.
Japanese Report of Reconsideration by Examiner Before Appeal for Japanese Application No. 2016-526947, dated Apr. 10, 2019 with translation, 3 pages.
Jenkins, "Practical Requirements for a Domestic Vacuum-Cleaning Robot", From: AAAI Technical Report FS-93-03., JRL Consulting, Menlo Park, California, pp. 85-90.
Jones et al., Mobile Robots Inspiration to Implementation, Second Edition, A.K. Peters, Ltd., 1999, Chapters 1 and 5, 72pages.
Jones etal., Mobile Robots Inspiration to Implementation, Second Edition, A.K. Peters Ltd., 1999, Chapters 6 and 9, 56 pages.
Jones etal., Mobile Robots Inspiration to Implementation, Second Edition, A.K. Peters, Ltd., 1999, Chapters 10 and 11, 45 pages.
Jung, et al. "Whisker Based Mobile Robot Navigation", Wollongong, NSW 2500, Australia, pp. 1-8.
Korean Office Action for Korean Application No. 10-20157030949, dated Mar. 29, 2019, 6 pages.
Korean Office Action for Korean Application No. 10-2016-7015470, dated Sep. 30, 2019 with translation, 9 pages.
Korean Office Action for Korean Application No. 10-2016-7016792, dated Aug. 21, 2019, with translation, 10 pages.
Krishna, et al., "Solving the Local Minima Problem for a Mobile Robot by Classification of Spatio-Temporal Sensory Sequences", Journal of Robotic Systems 17 (10), 2000, pp. 549-564.
Kube, "A Minimal Infrared Obstacle Detection Scheme", Department of Computing Science, University of Alberta, Edmonton, Alberta, Canada, The Robotics Practitioner, 2(2): 15-20, 1996, Oct. 23, 1998, pp. 1-8.
Larson, "RoboKent—a case study in man-machine interfaces" Industrial Robot, vol. 25 No. 2, 1998, pp. 95-100.
LeBouthillier, "W. Grey Walter and his Turtle Robots", The Robot Builder, vol. Eleven No. Five, May 1999, RSSC POB 26044, Santa Ana, CA, pp. 1-8.
Maaref, et al. "Sensor-based navigation of a mobile robot in an indoor environment", Robotics and Autonomous Systems, 2002, Elsevier, 18 pages.
Michael Carsten Bosse, "Atlas: A Framework for Large Scale Automated Mapping and Localization", Massachusetts Institute of Technology, Feb. 2004, Part 2, 67 pages.
Michael Carsten Bosse, "Atlas: A Framework for Large Scale Automated Mapping and Localization", Massachusetts Institute of Technology, Feb. 2004, Part 1, 140 pages.
Non Final Office Action for U.S. Appl. No. 14/409,291, dated Dec. 28, 2016, 61 pages.
Non Final Office Action for U.S. Appl. No. 15/101,235, dated Nov. 1, 2017, 11 pages.
Non Final Office Action for U.S. Appl. No. 15/535,506, dated May 1, 2019, 16 pages.
Non Final Office Action for U.S. Appl. No. 14/784,106, dated Oct. 19, 2017, 11 pages.
Non Final Office Action for U.S. Appl. No. 15/100,667, dated Nov. 29, 2017, 22 pages.
Non Final Office Action for U.S. Appl. No. 15/100,667, dated Sep. 12, 2016, 24 pages.
Non Final Office Action for U.S. Appl. No. 15/101,212, dated May 17, 2017, 8 pages.
Non Final Office Action for U.S. Appl. No. 15/101,235 dated Apr. 21, 2017, 10 pages.
Non Final Office Action for U.S. Appl. No. 15/101,235, dated Jun. 14, 2018, 11 pages.
Non Final Office Action for U.S. Appl. No. 15/101,235, dated Sep. 6, 2019, 10 pages.
Non Final Office Action for U.S. Appl. No. 15/101,257, dated Feb. 10, 2017, 10 pages.
Non Final Office Action for U.S. Appl. No. 15/101,515, dated Apr. 18, 2018, 14 pages.
Non Final Office Action for U.S. Appl. No. 15/102,015, dated Aug. 17, 2017, 13 pages.
Non Final Office Action for U.S. Appl. No. 15/102,017, dated Feb. 16, 2018, 12 pages.
Non Final Office Action for U.S. Appl. No. 15/102,017, dated Jan. 22, 2019, 15 pages.
Non Final Office Action for U.S. Appl. No. 15/321,333, dated Oct. 24, 2018, 10 pages.
Non Final Office Action for U.S. Appl. No. 15/504,066, dated Nov. 5, 2018, 18 pages.
Non Final Office Action for U.S. Appl. No. 15/504,071, dated Aug. 8, 2019, 23 pages.
Non Final Office Action for U.S. Appl. No. 15/504,071, dated Nov. 2, 2018, 17 pages.
Non Final Office Action for U.S. Appl. No. 15/534,327, dated Mar. 7, 2019, 11 pages.
Non Final Office Action for U.S. Appl. No. 15/534,591, dated Aug. 9, 2019, 11 pages.
Non Final Office Action for U.S. Appl. No. 15/535,244, dated May 17, 2019, 6 pages.
Non Final Office Action for U.S. Appl. No. 15/565,467, dated Jan. 29, 2020, 12 pages.
Notice of Allowance for U.S. Appl. No. 15/100,667, dated Aug. 6, 2018, 10 pages.
Notice of Allowance for U.S. Appl. No. 14/409,291, dated Jun. 16, 2016, 13 pages.
Notice of Allowance for U.S. Appl. No. 14/409,291, dated Sep. 18, 2017, 8 pages.
Notice of Allowance for U.S. Appl. No. 14/784,106, dated Oct. 11, 2018, 7 pages.

(56) References Cited

OTHER PUBLICATIONS

Notice of Allowance for U.S. Appl. No. 15/101,212 dated Apr. 11, 2018, 9 pages.
Notice of Allowance for U.S. Appl. No. 15/101,235, dated Dec. 12, 2019, 8 pages.
Notice of Allowance for U.S. Appl. No. 15/101,257, dated Jul. 6, 2017, 9 pages.
Notice of Allowance for U.S. Appl. No. 15/101,510, dated May 30, 2019, 12 pages.
Notice of Allowance for U.S. Appl. No. 15/101,515, dated Aug. 28, 2018, 11 pages.
Notice of Allowance for U.S. Appl. No. 15/102,015, dated Dec. 11, 2017, 8 pages.
Notice of Allowance for U.S. Appl. No. 15/102,295, dated Sep. 24, 2018, 9 pages.
Notice of Allowance for U.S. Appl. No. 15/504,066, dated Aug. 9, 2019, 8 pages.
Notice of Allowance for U.S. Appl. No. 15/504,071, dated Mar. 23, 2020, 11 pages.
Notice of Allowance for U.S. Appl. No. 15/534,327, dated Aug. 13, 2020, 5 pages.
Notice of Allowance for U.S. Appl. No. 15/535,244, dated Sep. 10, 2019, 5 pages.
Notice of Allowance for U.S. Appl. No. 15/535,467, dated Sep. 22, 2020, 6 pages.
Notice of Reasons for Rejection for Japanese Application No. 2016-526756, dated Aug. 10, 2017, with translation, 6 pages.
Notice of Reasons for Rejection for Japanese Application No. 2016-526759, dated Aug. 24, 2017 with translation, 9 pages.
Notice of Reasons for Rejection for Japanese Application No. 2016-526765, dated Aug. 25, 2017 with translation, 7 pages.
Notice of Reasons for Rejection of Japanese Application No. 2016-526764, dated Aug. 25, 2017 with translation. 6 pages.
Notification for Reasons for Refusal for Japanese Application No. 2016-526875, dated Oct. 31, 2017 with translation, 10 pages.
Notification of Reasons for Refusal for Japanese Application No. 2016-526945, dated Oct. 31, 2017 with translation, 8 pages.
Notification of Reasons for Refusal for Japanese Application No. 2016-568949, dated Oct. 9, 2018 with translation, 6 pages.
Notification of Reasons for Refusal for Japanese Application No. 2017-544589, dated Apr. 2, 2019 with translation, 6 pages.
Notification of Reasons for Rejection for Japanese Application No. 2016-526947, dated Sep. 21, 2017 with translation, 8 pages.
Oren, Reply to Office Action dated Jun. 23, 2014, U.S. Appl. No. 13/757,985, pp. 1-10.
Pack, et al., "Constructing a Wall-Follower Robot for a Senior Design Project", 1996 ASEE Annual Conference Proceedings, Session 1532, pp. 1-7.
Position_Definition of Position by Merriam-Webster.pdf (Position | Definition of Position by Merriam-Webster, Oct. 16, 2016, Merriam-Webster, https://www.merriam-webster.com/dictinary/position, pp. 1-15).
Report of Reconsideration for Japanese Application No. 2016-526875, dated Oct. 24, 2018, 2 pages.
Saffiotti, "Fuzzy logic in Autonomous Robot Navigation", a case study, Nov. 1995 Revised: Aug. 1997, Iridia, Universite Libre de Bruxelles, Belgium, , Technical Report TR/IRIDIA/ 95 25, Cover page + pp. 1-14.
Written Opinion for International Application No. PCT/EP2013/067500 dated Dec. 10, 2013, 7 pages.
Yamamoto, "SOZZY: A Hormone-Driven Autonomous Vacuum Cleaner", From: AAAI Technical Report FS-93-03, Matasushita Research Institute, Tokyo, and MIT Artificial Intelligence laboratory, Massachusetts, pp. 116-124 + Figure 9 and Figure 11.
Yoshida et al., "Online Motion Planning Using Path Deformation and Replanning", 28th Annual Robot Society, with partial translation, 2011, vol. 29, No. 8, Chapter 3, pp. 716-725.
International Search Report and Written Opinion for International Application No. PCT/EP2018/063177, dated Mar. 7, 2019, 9 pages.
Chinese Office Action for Chinese Application No. 201780094600.0, dated Jan. 5, 2022 with translation, 24 pages.
Japanese Notice of Reasons for Refusal issued in Japanese Application No. 2020-505825, dated Mar. 9, 2021 with translation, 10 pages.
Office Action issued in Chinese Application No. 201780094600.0, dated Apr. 28, 2021, 11 pages.
Chinese Office Action issued in Chinese Patent Application No. 2017800942211, dated Oct. 18, 2021 with translation, 19 pages.
USPTO Non Final Office Action for U.S. Appl. No. 16/643,625, dated Apr. 14, 2022, 99 pages.
USPTO Final Office Action issued in U.S. Appl. No. 16/643,625, dated Aug. 4, 2022, 17 pages.
Non Final Office Action for U.S. Appl. No. 16/643,625, dated Nov. 9, 2022, 11 pages.

* cited by examiner

CONTROLLING MOVEMENT OF A ROBOTIC CLEANING DEVICE

This application is a U.S. National Phase application of PCT International Application No. PCT/EP2017/074406, filed Sep. 26, 2017, which is incorporated by reference herein.

TECHNICAL FIELD

The invention relates to a method of controlling movement of a robotic cleaning device over an area to be cleaned, and a robotic cleaning device performing the method.

BACKGROUND

In many fields of technology, it is desirable to use robots with an autonomous behaviour such that they freely can move around a space without colliding with possible obstacles.

Robotic vacuum cleaners are known in the art, which are equipped with drive means in the form of a motor for moving the cleaner across a surface to be cleaned. The robotic vacuum cleaners are further equipped with intelligence in the form of microprocessor(s) and navigation means for causing an autonomous behaviour such that the robotic vacuum cleaners freely can move around and clean a surface in the form of e.g. a floor. Thus, these prior art robotic vacuum cleaners have the capability of autonomously vacuum clean a room in which objects such as tables and chairs and other obstacles such as walls and stairs are located.

Robotic vacuum cleaners use various sensors to keep track of where they are, and detect objects, i.e. obstacles, in their vicinity. The obstacle detection is more or less intelligent depending on complexity of the particular robotic vacuum cleaner, but will inevitably make occasional errors. For instance, the robotic cleaner may avoid areas where it should go, or bump into objects that it should stay away from.

SUMMARY

An object of the present invention is to solve, or at least mitigate, this problem in the art and thus to provided an improved method of controlling movement of a robotic cleaning device over an area to be cleaned.

In a first aspect of the invention a method of controlling movement of a robotic cleaning device over an area to be cleaned is provided. The method comprises storing at least one representation of the area over which the robotic cleaning device is to move, receiving an instruction to execute a cleaning program, localizing, in response to the instruction, the robotic cleaning device relative to the stored representation, and moving over the area to be cleaned as stipulated by the cleaning program by taking into account the stored representation.

In a second aspect of the invention a robotic cleaning device is provided. The robotic cleaning device comprises a propulsion system configured to move the robotic cleaning device over an area to be cleaned, a memory configured to store at least one representation of the area over which the robotic cleaning device is to move, and a controller configured to receive an instruction to execute a cleaning program, to localize, in response to the instruction, the robotic cleaning device relative to the stored representation, and to control the propulsion system to move the robotic cleaning device over the area to be cleaned as stipulated by the cleaning program by taking into account the stored representation.

Hence, the robotic cleaning device advantageously stores a representation, or map, of an area to be cleaned. Upon receiving an instruction to execute a cleaning program, for instance by having a user operate an App on her smart phone where she simply presses "start program", and submits the instruction e.g. via a radio signal to the robotic cleaning device, the robotic cleaning device will, in response to the instruction, localize itself relative to the stored representation. For instance, the robotic cleaning device may assume that its charging station has not moved since the last cleaning session, and thus use that as a reference to localize itself relative to the representation 10. It may also use a sensor such as a camera, lidar, radar, 3D camera, sonar or similar to scan the immediate surroundings when starting the cleaning session, and then compare the scan to a similar scan, associated with the representation. If the scans are sufficiently similar, that can be used to localize the robotic cleaning device to the representation. Then, the robotic cleaning device moves over the area to be cleaned as stipulated by the cleaning program by taking into account the stored representation.

By knowing e.g. the extent and shape of the cleaning area, the robotic cleaning device can advantageously plan how to divide the area into cells in a more efficient manner than when cleaning without prior information. The device can also minimize the time spent in transport, by starting in one end of the area, rather than cleaning outwards from the middle, having to transport across the area when one side is done. Further, it may plan when to go back to the charging station and recharge, to avoid leaving a small area uncleaned in a room and thereby avoiding having to climb over a threshold to that room several times.

In an embodiment, the instruction received further advantageously comprises user advice on how to execute the cleaning program, and the robotic cleaning device associates this user advice with the stored representation, the robotic cleaning device will then move across the area to be cleaned by taking into account the stored representation and the associated user advice.

In an exemplifying embodiment, the user advice comprises instructions to the robotic cleaning device to avoid one or more sub-areas in the stored representation.

In another exemplifying embodiment, the user advice comprises instructions to pass a boundary indicated in the stored representation.

In still another exemplifying embodiment, the user advice comprises instructions to move into contact with an object indicated in the stored representation.

In yet another exemplifying embodiment, the user advice comprises instructions to move over one or more sub areas in the stored representation multiple times.

In still a further exemplifying embodiment, the user advice comprises instructions to move over sub areas in the stored representation in a prioritized order.

In another embodiment, the robotic cleaning device deactivates the received user advice if after at least one attempt the robotic cleaning device is unable to move as stipulated by the user advice.

In a further embodiment, the robotic cleaning device stores, from one cleaning session to another, a representation of the area over which the robotic cleaning device is to move only if user advice has been associated with the representation.

In still another embodiment, the robotic cleaning device cancels the stored representation upon being instructed to clean a new area.

In a further embodiment, the robotic cleaning device requests advice from a user for instructions on how to move over the area to be cleaned.

In yet another embodiment the robotic cleaning device proposes, to a user, a sub-area in the representation to be cleaned, and receives, in response to the proposal, an instruction from the user on how to proceed.

In another embodiment, the instruction from the user comprises an instruction to modify the proposed sub-area.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

The invention relates to robotic cleaning devices, or in other words, to automatic, self-propelled machines for cleaning a surface, e.g. a robotic vacuum cleaner, a robotic sweeper or a robotic floor washer. The robotic cleaning device according to the invention can be mains-operated and have a cord, be battery-operated or use any other kind of suitable energy source, for example solar energy.

Figure 1:
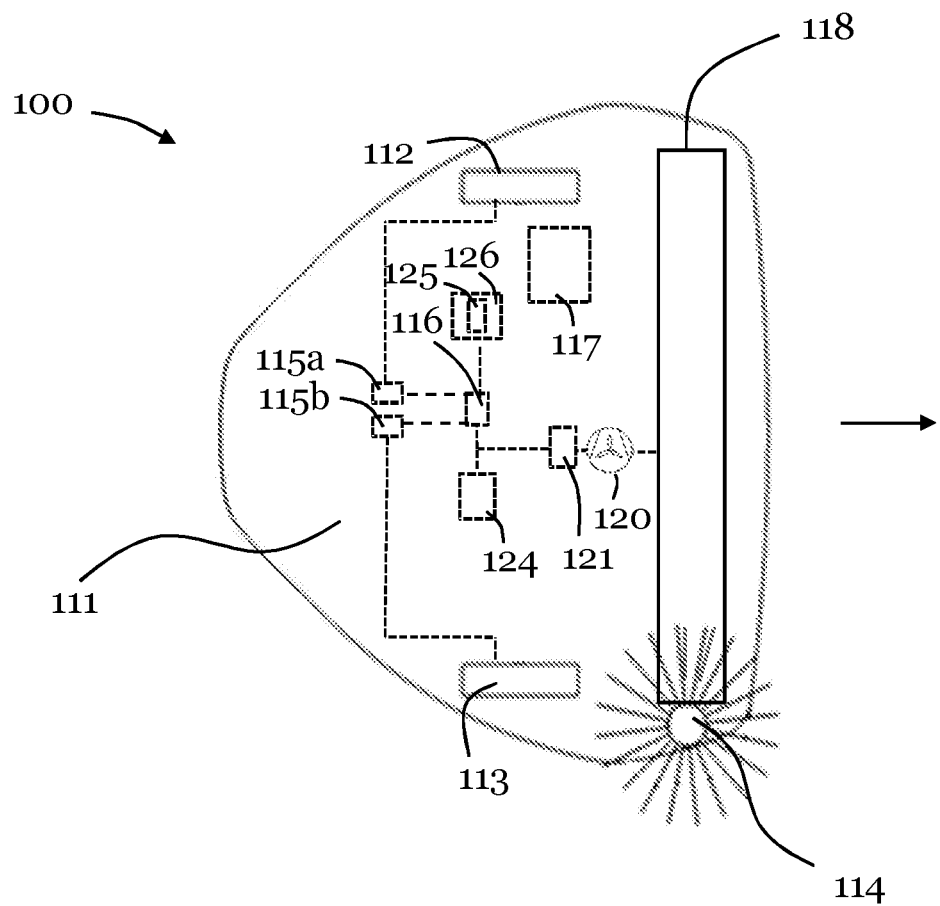
FIG. 1 shows a robotic cleaning device according to an exemplifying embodiment of the present invention.

Even though it is envisaged that the invention may be performed by a variety of appropriate robotic cleaning devices being equipped with sufficient processing intelligence, FIG. 1 shows a robotic cleaning device 100 according to an embodiment of the present invention in a bottom view, i.e. the bottom side of the robotic cleaning device is shown. The arrow indicates the forward direction of the robotic cleaning device 1000 being illustrated in the form of a robotic vacuum cleaner.

The robotic cleaning device 100 comprises a main body in housing components such as a propulsion system comprising driving means in the form of two electric wheel motors 115a, 115b for enabling movement of the driving wheels 112, 113 such that the cleaning device can be moved over a surface to be cleaned. Each wheel motor 115a, 115b is capable of controlling the respective driving wheel 112, 113 to rotate independently of each other in order to move the robotic cleaning device 10o across the surface to be cleaned. A number of different driving wheel arrangements, as well as various wheel motor arrangements, can be envisaged. It should be noted that the robotic cleaning device may have any appropriate shape, such as a device having a more traditional circular-shaped main body, or a triangular-shaped main body. As an alternative, a track propulsion system may be used or even a hovercraft propulsion system. The propulsion system may further be arranged to cause the robotic cleaning device 100 to perform any one or more of a yaw, pitch, translation or roll movement.

A controller 116 such as a microprocessor controls the wheel motors 115a, 115b to rotate the driving wheels 112, 113 as required in view of information received from an obstacle detecting device (not shown in FIG. 1) for detecting obstacles in the form of walls, floor lamps, table legs, around which the robotic cleaning device must navigate. The obstacle detecting device may be embodied in the form of a 3D sensor system registering its surroundings, implemented by means of e.g. a 3D camera, a camera in combination with lasers, a laser scanner, etc. for detecting obstacles and communicating information about any detected obstacle to the microprocessor 116. The microprocessor 116 communicates with the wheel motors 115a, 115b to control movement of the wheels 112, 113 in accordance with information provided by the obstacle detecting device such that the robotic cleaning device 100 can move as desired across the surface to be cleaned.

Further, the robotic cleaning device 100 is equipped with one or more batteries 117 for powering the different components included in the cleaning device 100. The one or more batteries 117 are charged via a charging station into which the robotic cleaning device 100 docks.

Moreover, the main body 111 of the robotic cleaner 100 comprises a suction fan 120 creating an air flow for transporting debris to a dust bag or cyclone arrangement (not shown) housed in the main body via the opening 118 in the bottom side of the main body 111. The suction fan 120 is driven by a fan motor 121 communicatively connected to the controller 116 from which the fan motor 121 receives instructions for controlling the suction fan 120. The main body 111 may further be arranged with one or more rotating side brushes 114 adjacent to the opening 118.

With further reference to FIG. 1, the controller/processing unit 116 embodied in the form of one or more microprocessors is arranged to execute a computer program 125 downloaded to a suitable storage medium 126 associated with the microprocessor, such as a Random Access Memory (RAM), a Flash memory or a hard disk drive. The controller 116 is arranged to carry out a method according to embodiments of the present invention when the appropriate computer program 125 comprising computer-executable instructions is downloaded to the storage medium 126 and executed by the controller 116. The storage medium 126 may also be a computer program product comprising the computer program 125. Alternatively, the computer program 125 may be transferred to the storage medium 126 by means of a suitable computer program product, such as a digital versatile disc (DVD), compact disc (CD) or a memory stick. As a further alternative, the computer program 125 may be downloaded to the storage medium 126 over a wired or wireless network.

The controller 116 may alternatively be embodied in the form of a digital signal processor (DSP), an application specific integrated circuit (ASIC), a field-programmable gate array (FPGA), a complex programmable logic device (CPLD), etc.

Figure 2:
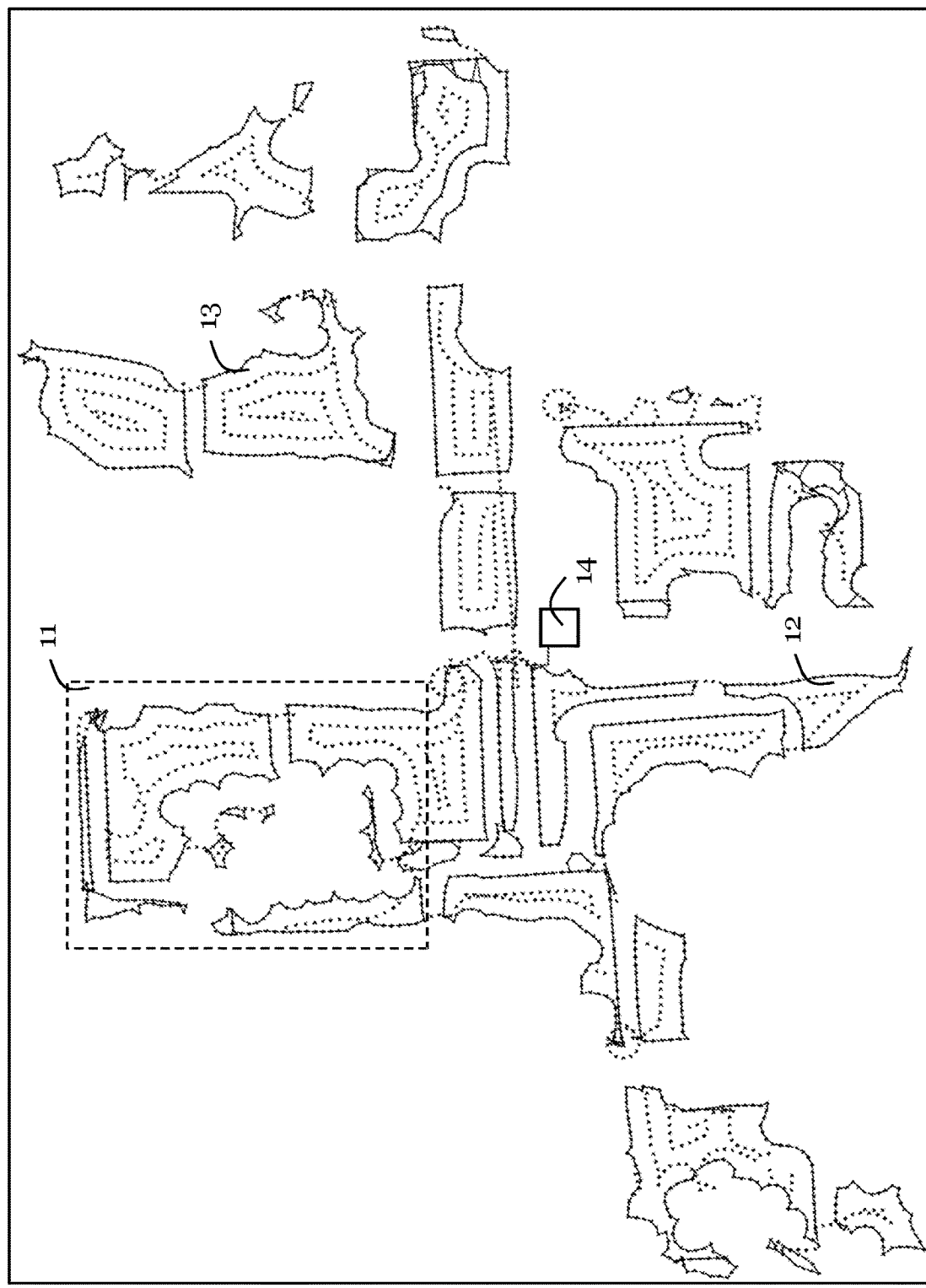
FIG. 2 illustrates a representation of an area to be cleaned in an embodiment.

FIG. 2 illustrates a representation 10, or map, of an area to be cleaned by the robotic cleaning device 100. For instance, the representation 10 may represent a floor of a house, where different sub-areas of the representation 10 represent various rooms such as a kitchen 11, a living room 12, a bed room 13, etc.

Figure 3:
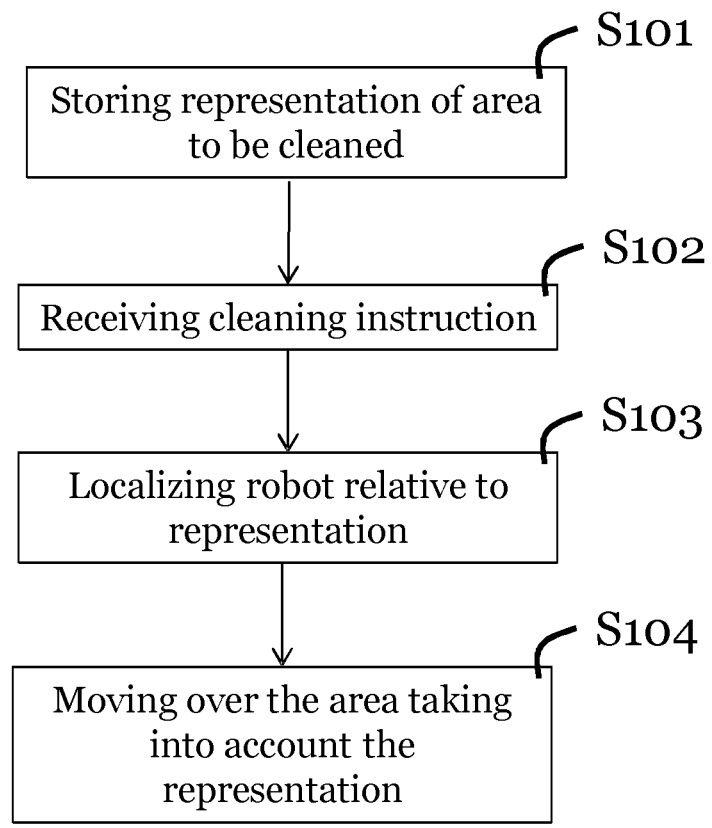
FIG. 3 shows a flowchart of a method according to an embodiment of the invention.

In an embodiment, further illustrated with reference to a flowchart of FIG. 3, a robotic cleaning device stores S101 at least one representation 10 of the area over which the robotic cleaning device is to move.

Now, in step S102, the robotic cleaning device receives an instruction to execute a cleaning program. For instance, it is envisaged that a user has an App on her smart phone where the user simply presses "start program", whereupon a radio signal is submitted to the robotic cleaning device from the smart phone via for instance WiFi.

Upon receiving the instruction to start the cleaning program in step S102, the robotic cleaning device 100 will, in response to the instruction, localize itself relative to the stored representation 10 in step S103.

For instance, the robotic cleaning device 100 may assume that charging station 14 has not moved since the last cleaning session, and thus use that as a reference to localize itself relative to the representation 10. It may also use a sensor such as a camera, lidar, radar, 3D camera, sonar or similar to scan the immediate surroundings when starting the cleaning session, and then compare the scan to a similar scan, associated with the representation 10. If the scans are sufficiently similar, that can be used to localize the robotic cleaning device 100 relative to the representation 10.

Thereafter, the robotic cleaning device 100 moves over the area to be cleaned in step S104 as stipulated by the cleaning program by taking into account the stored representation 10.

As an example, by knowing the extent and shape of the cleaning area, the robotic cleaning device 100 could plan how to divide the area into cells in a more efficient manner than when cleaning without prior information. It could also minimize the time spent in transport, by starting in one end of the area, rather than cleaning outwards from the middle, having to transport across the area when one side is done. Further, it could plan when to go back to the charging station 14 and recharge, to avoid leaving a small area uncleaned in a room and thereby avoiding having to climb over a threshold to that room several times.

The stored representation 10 may be a representation that has been created by the robotic cleaning device itself, for instance created during the execution of a previous cleaning program. However, it is also possible that the robotic cleaning device is provided with a representation or map by the user.

Figure 4:
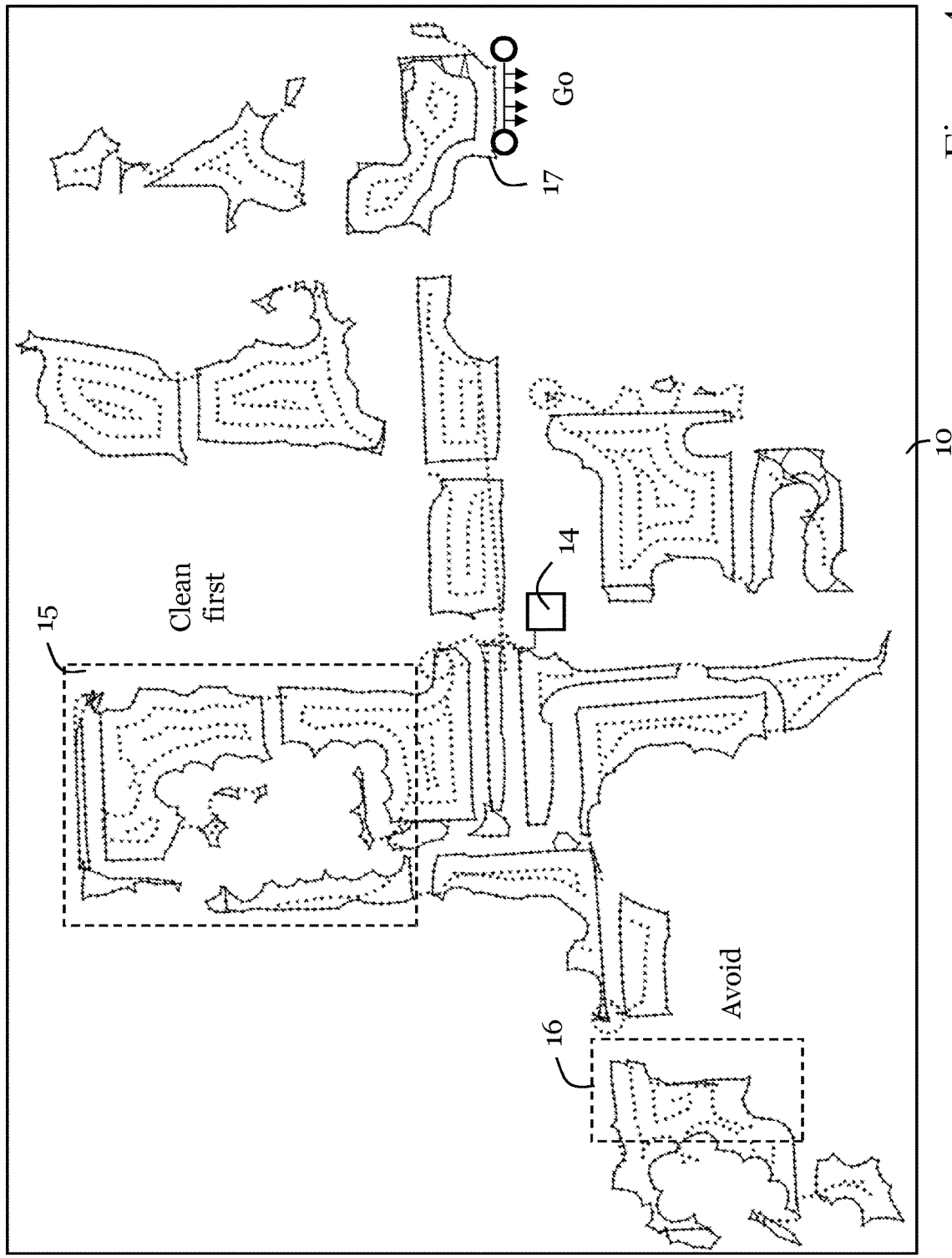
FIG. 4 illustrates a representation of an area to be cleaned in another embodiment.

FIG. 4 illustrates the representation 10 of FIG. 2. However, in this particular embodiment, the user is capable of advising the robotic cleaning device 100 on how to carry out the cleaning program.

Figure 5:
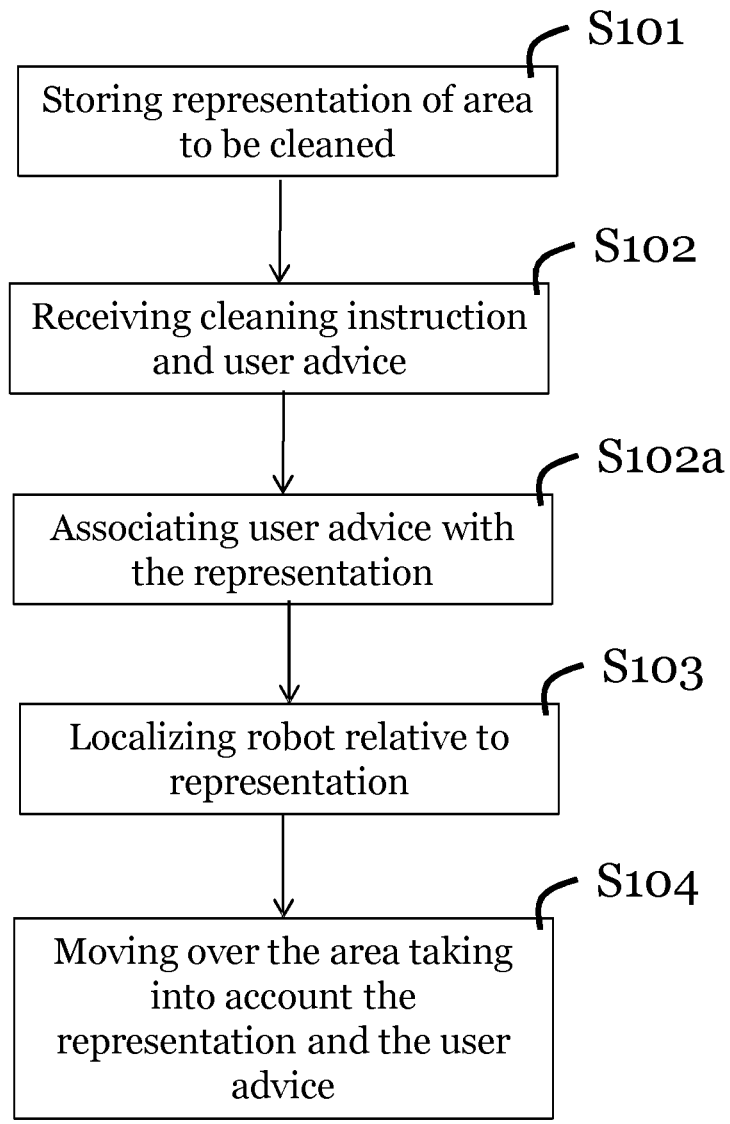
FIG. 5 shows a flowchart of a method according to a further embodiment of the invention.

In the flowchart of FIG. 5, the robotic cleaning device 100 stores S101 the representation 10 of the area over which the robotic cleaning device 100 is to move.

Now, in step S102, the robotic cleaning device 100 receives an instruction to execute a cleaning program. For instance, it is envisaged that a user has an App on her smart phone where the representation 10 is shown, and the user may simply press the screen to indicate that the cleaning program should commence, whereupon a radio signal is submitted to the robotic cleaning device from the smart phone via for instance WiFi.

In this particular exemplifying embodiment, the user advises the robotic cleaning device 100 by indicating a sub-area 15 (corresponding to the kitchen 11 of FIG. 2) on the representation 10 by pressing her smart phone screen, thus instructing the robotic cleaning device 100 to start cleaning the sub-area 15.

Upon receiving the instruction to start the cleaning program in step S102, the robotic cleaning device 100 will, in response to the instruction, associate the received user advice to start cleaning sub-area 15 with the stored representation 10 in step S102*a*. The particular advice to start cleaning the sub-area 15 is referred to as a procedural device.

In another example, the user advises the robotic cleaning device 100 to avoid sub-area 16 altogether. It should be noted that these user advice may be associated with the representation 10 on a more or less permanent basis (or at least until counter-advice is given), meaning that the association of the user advice to the stored representation 10 is maintained over time. The user advice to not go to a certain area is referred to as a negative advice.

In a further example, a third type of advice is given referred to as a positive advice. For instance, at sub-area 17, the robotic cleaning device 100 is given the advice to pass some boundary—for instance a threshold—and/or bump objects to make them move, such as a pile of shoes in a cloakroom. It could alternatively apply to a textile lining under a sofa or an area full of toys in a kid's room. It could also be a threshold where the floor on the other side is so glossy that the robotic cleaning device 100 perceives it as a hole, which it refuses to traverse. Further, it could be a door that the robot can push open if it happens to be only semi-open.

Again, the robotic cleaning device 100 localizes itself with respect to the representation 10 as previously discussed.

Thereafter, the robotic cleaning device moves over the area to be cleaned in step S104 as stipulated by the cleaning program by taking into account the stored representation 10, as well as the received user advice. Again with reference to FIG. 4, it is in an embodiment envisaged that received user advice is deactivated if after at least one attempt the robotic cleaning device 100 is unable to move as stipulated by the user advice.

For instance, in case of receiving user advice to try and open an alleged semi-open door, and after concluding that the door cannot be opened (since it for instance is closed), there is no point in proceeding with carrying out the advice. Hence, the robotic cleaning device 100 deactivates the user advice.

This could also occur in a situation where the user made an error, or subsequently changes something in her home and forgot to update the advice (or the representation). Any deactivation of a user device may be indicated on the representation, for instance by using a special symbol removable from the representation by the user.

In yet an embodiment, the robotic cleaning device 100 requests advice from a user for instructions on how to move over the surface to be cleaned.

Various situations can be envisaged where it would be desirable to have the robotic cleaning device 100 ask for advice:

a) if the robotic cleaning device identifies an area that is slippery, but is enclosed by distinct edges; mark the area as a carpet and ask the user if she wants to label that area with negative advice (e.g. "avoid"), b) if the robotic cleaning device identifies an area with many small obstacles; mark the area as possibly accommodating chairs and tables and ask the user if she wants to label it with procedural advice (e.g. "clean twice" or "clean first"), c) if the robotic cleaning device repeatedly gets stuck at a specific area; mark the area as problematic and ask the user if she wants to label it with negative advice and possibly modify the shape of the area on the stored representation to correctly reflect the difficult area.

As can be concluded, a great number of situations may be envisaged where it would be desirable to ask the user for advice.

In a further embodiment, the robotic cleaning device stores a representation from one cleaning session to another only if user advice has been added to the representation.

If the robot is moved to a new area, it needs to decide what to do with stored representation(s). Hence, it may be envisaged that the robotic cleaning device should store one representation corresponding to current surroundings, and only save older representations if they have advice associated with them.

That way, if the user moves the robot between different floors or even different homes, a plurality of prior representations being stored is avoided, unless the user associates advice with them.

Further, to avoid a process where the controller 116 is burdened with spending processing power on localizing the robot with respect to stored representations, it may be advisable to only store a few representations, such as one, two or perhaps three.

In still a further embodiment, the robotic cleaning device proposing, to a user, a sub-area in the representation to be cleaned, whereby the user submits, in response to the proposal, an instruction whether to clean the proposed sub-area or not.

For instance, the robotic cleaning device could put a mark on the representation to be viewed on the App of the user's smart phone. In response, the user could just confirm that the marked sub-area should be cleaned (or that it should not be cleaned). The robotic cleaning device 100 may e.g. identify a room from thresholds, doorways and walls, even if the room would be absent in the stored representation.

Moreover, the instruction from the user could comprise any suitable user advice, or even a modified version of the sub-area proposed by the robotic cleaning device 100, in case the user would not agree with the robotic cleaning device wo as regards the proposed sub-area.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of controlling movement of a robotic cleaning device over an area to be cleaned, the method comprising:
   storing at least one representation of the area over which the robotic cleaning device is to move;
   identifying a boundary within the area as a location that cannot be traversed by the robotic cleaning device, wherein identifying the boundary is performed by the robotic cleaning device and without receiving a prior identification of the boundary;
   receiving an instruction to execute a cleaning program, the instruction including user advice from the user on how to execute the cleaning program;
   associating the user advice with the stored at least one representation of the area over which the robotic cleaning device is to move,
   wherein the user advice comprises instructions for the robotic cleaning device to avoid one or more sub-areas in the stored representation, and instructions to pass the boundary;
   localizing, in response to the instruction, the robotic cleaning device relative to the stored representation; and
   moving the robotic cleaning device over the area to be cleaned as stipulated by the cleaning program by taking into account the stored representation while avoiding moving over the one or more sub-areas in the stored representation until counter advice is received from the user permitting the robotic cleaning device to move over the one or more sub-areas, and moving over the boundary indicated in the stored representation.

2. The method of claim 1, wherein the method further comprises deactivating the instructions to pass the boundary if after at least one attempt the robotic cleaning device is unable to pass the boundary.

3. The method of claim 1, wherein boundary is identified in the stored representation as an object that extends vertically above a plane of the area to be cleaned.

4. The method of claim 3, wherein the method further comprises:
   deactivating the received instructions to move into contact with the object if after at least one attempt the robotic cleaning device is unable to move into contact with the object indicated in the stored representation as stipulated by the user advice.

5. The method of claim 3, wherein moving over the boundary indicated in the stored representation comprises pushing the object.

6. The method of claim 1, wherein the user advice comprises instructions to move over one or more sub areas in the stored representation multiple times.

7. The method of claim 1, wherein the user advice comprises instructions to move over sub areas in the stored representation in a prioritized order.

8. The method of claim 1, further comprising:
   storing, from one cleaning session to another, a representation of the area over which the robotic cleaning device is to move only if user advice has been associated with the representation.

9. The method of claim 1, further comprising:
   requesting advice from a user for instructions on how to move over the area to be cleaned.

10. The method of claim 1, further comprising:
    cancelling the stored representation upon the robotic cleaning device being instructed to clean a new area.

11. The method of claim 1, further comprising:
    proposing, to a user, a sub-area in the representation to be cleaned; and
    receiving, in response to the proposal, an instruction from the user on how to proceed.

12. The method of claim 11, wherein the instruction from the user comprises an instruction to modify the proposed sub-area.

13. The method of claim 1, wherein the boundary is identified in the stored representation as a hole.

14. A robotic cleaning device comprising:
- a propulsion system configured to move the robotic cleaning device over an area to be cleaned;
- a memory configured to store at least one representation of the area over which the robotic cleaning device is to move; and
- a controller configured to:
  - identify a boundary within the area as a location that cannot be traversed by the robotic cleaning device, wherein identifying the boundary is performed by the robotic cleaning device and without receiving a prior identification of the boundary;
  - receive an instruction to execute a cleaning program, the instruction including user advice from the user on how to execute the cleaning program;
  - associate the user advice with the stored at least one representation of the area over which the robotic cleaning device is to move,
  - wherein the user advice comprises instructions for the robotic cleaning device to avoid one or more sub-areas in the stored representation, and instructions to pass the boundary;
  - localize, in response to the instruction, the robotic cleaning device relative to the stored representation; and
  - control the propulsion system to move the robotic cleaning device over the area to be cleaned as stipulated by the cleaning program by taking into account the stored representation while avoiding moving over the one or more sub-areas in the stored representation until counter advice is received from the user permitting the robotic cleaning device to move over the one or more sub-areas, and moving over the boundary indicated in the stored representation.

15. The robotic cleaning device of claim 14, wherein the controller is configured to deactivate the received user advice to pass the boundary if after at least one attempt the robotic cleaning device is unable pass the boundary.

16. The robotic cleaning device of claim 14, the boundary is identified in the stored representation as an object that extends vertically above a plane of the area to be cleaned.

17. The robotic cleaning device of claim 16, wherein the controller is configured to deactivate the instructions to move into contact with the object if after at least one attempt the robotic cleaning device is unable to move into contact with the object as stipulated by the user advice.

18. The robotic cleaning device of claim 16, wherein moving over the boundary indicated in the stored representation comprises pushing the object.

19. The robotic cleaning device of claim 14, wherein the user advice comprises instructions to move over one or more sub areas in the stored representation multiple times.

20. The robotic cleaning device of claim 14, wherein the user advice comprises instructions to move over sub areas in the stored representation in a prioritized order.

21. The robotic cleaning device of claim 14, wherein the memory is further configured to:
  - store from one cleaning session to another, a representation of the area over which the robotic cleaning device is to move only if user advice has been associated with the representation.

22. The robotic cleaning device of claim 14, wherein the controller is further configured to:
  - request advice from a user for instructions on how to move over the area to be cleaned.

23. The robotic cleaning device of claim 14, wherein the controller is further configured to:
  - cancel the stored representation upon the robotic cleaning device being instructed to clean a new area.

24. The robotic cleaning device of claim 14, wherein the controller is further configured to:
  - propose, to a user, a sub-area in the representation to be cleaned; and
  - receive, in response to the proposal, an instruction from the user on how to proceed.

25. The robotic cleaning device of claim 24, wherein the instruction from the user comprises an instruction to modify the proposed sub-area.

26. The robotic cleaning device of claim 14, wherein the boundary is identified in the stored representation as a hole.

* * * * *